United States Patent
Yuki et al.

(10) Patent No.: US 10,488,704 B2
(45) Date of Patent: Nov. 26, 2019

(54) LIGHTING DEVICE AND DISPLAY DEVICE

(71) Applicant: Sharp Kabushiki Kaisha, Sakai, Osaka (JP)

(72) Inventors: Ryuzo Yuki, Sakai (JP); Mitsuhiro Murata, Sakai (JP); Hisashi Watanabe, Sakai (JP); Hirotoshi Yasunaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/736,858

(22) PCT Filed: Jun. 10, 2016

(86) PCT No.: PCT/JP2016/067335
§ 371 (c)(1),
(2) Date: Dec. 15, 2017

(87) PCT Pub. No.: WO2016/204083
PCT Pub. Date: Dec. 22, 2016

(65) Prior Publication Data
US 2018/0173058 A1    Jun. 21, 2018

(30) Foreign Application Priority Data
Jun. 19, 2015  (JP) .................. 2015-124042

(51) Int. Cl.
*G02F 1/1335* (2006.01)
*F21V 8/00* (2006.01)
(Continued)

(52) U.S. Cl.
CPC ..... *G02F 1/133603* (2013.01); *G02B 6/0053* (2013.01); *G02B 6/426* (2013.01);
(Continued)

(58) Field of Classification Search
CPC ..... G02B 6/0053; G02B 6/0091; G02B 6/426
See application file for complete search history.

(56) References Cited

U.S. PATENT DOCUMENTS

| 6,053,619 A * | 4/2000 | Nakamura | G02B 6/0031 362/561 |
| 7,157,125 B2 * | 1/2007 | Kamiya | C09J 7/38 428/1.5 |

(Continued)

FOREIGN PATENT DOCUMENTS

| JP | 2004-031146 A | 1/2004 |
| JP | 2008-171719 A | 7/2008 |

(Continued)

OTHER PUBLICATIONS

English Machine tralstaion of JP 2004031146 provided by Espacenet (Year: 2004).*

(Continued)

*Primary Examiner* — Zheng Song
(74) *Attorney, Agent, or Firm* — Keating & Bennett, LLP

(57) ABSTRACT

A backlight device includes LEDs, a light guide plate, a LED board, and a bonding member. The light guide plate has a light entrance edge surface that is a part of peripheral edge surfaces thereof and through which light from the LED enters, a light exiting plate surface that is one of plate surfaces thereof and through which light exits, and another one of the plate surfaces as an opposite plate surface. The LED board has a mounting surface on which the LEDs are mounted, and has a part overlapping a part of the light guide plate on an opposite plate surface side. The bonding member is bonded to the mounting surface of the part of the LED board and to the opposite plate surface of the part of the light guide plate and the bonding member includes a light absorbing bonding layer containing light absorbing material.

14 Claims, 30 Drawing Sheets

(51) Int. Cl.
*G02B 6/42* (2006.01)
*G02F 1/1333* (2006.01)

(52) U.S. Cl.
CPC .. *G02F 1/133308* (2013.01); *G02F 1/133606* (2013.01); *G02B 6/0023* (2013.01); *G02B 6/0051* (2013.01); *G02B 6/0073* (2013.01); *G02B 6/0088* (2013.01); *G02B 6/0091* (2013.01); *G02F 1/133615* (2013.01); *G02F 2001/133337* (2013.01); *G02F 2001/133607* (2013.01)

(56) References Cited

U.S. PATENT DOCUMENTS

| | | | |
|---|---|---|---|
| 7,530,723 B2 | 5/2009 | Ohno | |
| 7,771,100 B2 | 8/2010 | Yamamoto et al. | |
| 7,800,711 B2* | 9/2010 | Kim | G02B 6/0031 349/65 |
| 9,063,267 B2* | 6/2015 | Park | G02B 6/0051 |
| 2003/0202135 A1* | 10/2003 | Ono | G02B 6/0088 349/63 |
| 2008/0068858 A1* | 3/2008 | Yamamoto | G02B 6/0033 362/606 |
| 2008/0170412 A1 | 7/2008 | Ohno | |
| 2013/0044511 A1* | 2/2013 | Motooka | G02B 6/0013 362/606 |
| 2014/0063416 A1* | 3/2014 | Shimizu | G02B 6/005 349/65 |
| 2015/0036385 A1* | 2/2015 | Kawai | G02B 6/0031 362/613 |
| 2015/0098043 A1* | 4/2015 | Matsumoto | G02B 6/009 349/58 |

FOREIGN PATENT DOCUMENTS

| | | |
|---|---|---|
| JP | 4807205 B2 | 11/2011 |
| JP | 2012-109103 A | 6/2012 |
| JP | 2015-046317 A | 3/2015 |

OTHER PUBLICATIONS

Official Communication issued in International Patent Application No. PCT/JP2016/067335, dated Sep. 13, 2016.

* cited by examiner

LIGHTING DEVICE AND DISPLAY DEVICE

TECHNICAL FIELD

The present invention relates to a lighting device and a display device.

BACKGROUND ART

A liquid crystal display device requires a backlight unit as a separately provided lighting device because a liquid crystal panel does not emit light itself. The backlight unit in such a liquid crystal display device is generally classified into either a direct type or an edge-light type according to a mechanism thereof. An example of an edge-light type liquid crystal display device is disclosed in Patent Document 1. In the backlight device disclosed in Patent Document 1, a flexible printed circuit board including light sources thereon is arranged to cover the light sources and a part of a light exit surface of a light guide plate. An adhesive agent layer, a reinforcing plate, and a gap shielding member that is formed of a light blocking layer are disposed on a surface of the flexible printed circuit board opposite the light exit surface in this order from the board side. The reinforcing plate and the adhesive agent layer are made of light blocking material. The gap shielding member is in contact with the light exit surface and closes a gap between the flexible printed circuit board and the light exit surface.

RELATED ART DOCUMENT

Patent Document

Patent Document 1: Japanese Patent No. 4807205

Problem to be Solved by the Invention

In the backlight device described in Patent Document 1, the light blocking layer of the gap shielding member is formed by printing black coating material on a gold-plated reinforcing member. Therefore, contact adhesion between the light guide plate and the gap shielding member is low and a gap may be produced between the light guide plate and the gap shielding member. If such a gap is produced, light may leak through the gap and a bright portion may be locally seen in a surface area of the light exit surface by a user. Namely, unevenness in brightness may occur. An effective light exit area within the light exit surface may be reduced for less occurrence of such unevenness in brightness. However, a frame portion area of the backlight device may be increased.

DISCLOSURE OF THE PRESENT INVENTION

An object of the present invention is to reduce occurrence of unevenness in brightness.

Means for Solving the Problem

A lighting device according to the present technology includes alight source, a light guide plate having a light entrance edge surface that is a part of peripheral edge surfaces thereof and through which light from the light source enters, a light exiting plate surface that is one of a pair of plate surfaces thereof and through which light exits, and another one of the pair of plate surfaces being an opposite plate surface, a light source board having a mounting surface on which the light source is mounted, and having a part overlapping a part of the light guide plate on an opposite plate surface side, and a bonding member that is bonded to the mounting surface of the part of the light source board and to the opposite plate surface of the part of the light guide plate, the bonding member including a light absorbing bonding layer containing light absorbing material.

According to such a configuration, the light rays emitted by the light source enter the light guide plate through the light entrance edge surface and travel within the light guide plate and then, exit through the light exit plate surface. A part of the light source board on which the light source is mounted overlaps a part of the light guide plate on the opposite plate surface side. Therefore, if a gap is generated between the opposite plate surface of a part of the light guide plate and the light source board, light rays emitted by the light source may leak through the gap. The leaking light rays may exit through the light exit plate surface and unevenness in brightness may be seen in a portion of the light guide plate near the light source. The bonding member is bonded to the mounting surface of a part of the light source board and the opposite plate surface of a part of the light guide plate and the bonding member includes the light absorbing bonding layers formed of the bonding material and the light absorbing material contained in the bonding material. According to such a configuration, a gap is less likely to be generated between the mounting surface of a part of the light source board and the opposite plate surface of a part of the light guide plate and the light rays from the light source are absorbed by the light absorbing material contained in the light absorbing bonding layers such that the light rays from the light source are less likely to transmit through the bonding member. Accordingly, the unevenness in brightness is less likely to occur in the portion of the light guide plate near the light source. According to the less occurrence of the unevenness in brightness in the portion of the light guide plate near the light source, the light rays exiting through the light exit plate surface near the light source can be effectively used for display over a wide range, and the frame width of the lighting device can be optimally reduced.

Following configurations may be preferable for embodiments of the present technology.

(1) The light source may have an effective light emission area in a part of a surface thereof opposite the light entrance edge surface of the light guide plate, and light rays may be effectively emitted from the effective light emission area. The bonding member may have a thickness that is equal to or smaller than a distance from the mounting surface of the light source board to an outline of the effective light emission area. Accordingly, among the light rays emitted from the effective light emission area of the surface of the light source opposite the light entrance edge surface of the light guide plate, light rays directed in the normal direction of the light emission surface are less likely to be directly in contact with the bonding member. Accordingly, the light rays emitted by the light source are less likely to transmit through the light absorbing bonding layers and the unevenness in brightness is further less likely to be caused.

(2) The bonding member may be disposed at least in an area ranging from the light entrance edge surface of the light guide plate to a position on the light source board away from a light guide plate side edge of the light source board with respect to an arrangement direction in which the light source and the light guide plate are arranged. According to such a configuration, the light rays emitted by the light source and directed toward the portion between the opposite plate surface of the light guide plate and the mounting surface of the light source board are effectively absorbed at least by the light absorbing material contained in the light absorbing bonding layers of the bonding member that is disposed on a same position as the light entrance edge surface of the light guide plate with respect to the arrangement direction in which the light source and the light guide plate are arranged. Further, the light rays are less likely to be absorbed excessively by the light absorbing material contained in the light absorbing bonding layers compared to a configuration that the bonding member extends to the light guide plate side edge of the light source board with respect to the arrangement direction in which the light source and the light guide plate are arranged. Therefore, the brightness is less likely to be lowered.

(3) The bonding member may include a base member formed of a film, and bonding layers in a pair that are disposed on front and rear surfaces of the base member, respectively, and the base member may be formed to follow the mounting surface of the light source board and the opposite plate surface of the light guide plate. One of the bonding layers that is bonded to the opposite plate surface of the light guide plate may be the light source absorbing bonding layer. Thus, the bonding member is configured such that the bonding layers formed on the respective front and rear surfaces of the base member are bonded to the mounting surface of the light source board and the opposite plate surface of the light guide plate, respectively. Accordingly, the light source board and the light guide plate can be held. At least one of the bonding layers that is bonded to the opposite plate surface of the light guide plate is the light absorbing bonding layer. Therefore, the light rays emitted by the light source and directed toward a portion between the opposite plate surface of the light guide plate and the base member can be effectively absorbed by the light absorbing material contained in the light absorbing bonding layers. Accordingly, unevenness in brightness is less likely to occur.

(4) The base member of the bonding member may contain light absorbing material. Accordingly, the light rays emitted by the light source can be absorbed by the light absorbing material contained in the base member of the bonding member and therefore, unevenness in brightness is further less likely to be caused.

(5) The bonding layers in a pair included in the bonding member may be the light absorbing bonding layers. Accordingly, the light rays emitted by the light source and directed to the portion between the base member and the mounting surface of the light source board can be absorbed by the light absorbing material contained in each of the light absorbing layers. Therefore, unevenness in brightness is less likely to be caused.

(6) The lighting device may further include a light absorbing member overlapping a part of the light guide plate on the light exit plate surface side and containing a light absorbing material. According to such a configuration, among the light rays emitted by the light source, light rays travelling in the light guide plate toward a light exit plate surface without passing through a light entrance edge surface can be absorbed by light absorbing material contained in the light absorbing member. Therefore, unevenness in brightness is less likely to be caused.

(7) The lighting device may further include an optical member overlapping the light guide plate on the light exit plate surface side. The light absorbing member may overlap a part of the optical member while the light absorbing member and the light guide plate sandwiching the optical member. According to such a configuration, no light absorbing member is between the light exit plate surface of the light guide plate and the optical member. Therefore, light rays entering through the light entrance edge surface and travelling within the light guide plate are less likely to be absorbed by the light absorbing member and such light rays are totally reflected by the light exit plate surface and effectively used. Accordingly, brightness is less likely to be lowered.

(8) The bonding member and the light absorbing member may have portions overlapping the light guide plate and the portions may have a dimension with respect to an arrangement direction of the light source and the light guide plate, and the dimension may be within a range from 0.3 mm to 1 mm. If the above dimension is greater than 1 mm, the lowering of brightness is notable because the amount of light rays absorbed by the light absorbing material contained in the light absorbing bonding layers is too much. If the above dimension is lower than 0.3 mm, manufacturing and mounting of the bonding member may be difficult due to problems in processing precision. The dimension of the portion of the bonding member and the portion of the light absorbing member overlapping the light guide plate with respect to an arrangement direction in which the light source and the light guide plate are arranged is set within the range from 0.3 mm to 1 mm such that the brightness is less likely to be lowered and the manufacturing and the mounting will be easy.

(9) The lighting device may further include a frame member disposed to surround the light source and the light guide plate. The bonding member may include a frame member bonding portion bonding the mounting surface of the light source board and the frame member. According to such a configuration, the frame member is held by the light source board with the frame bonding portion. The number of parts is reduced compared to a configuration including another member for bonding the frame member to the mounting surface of the light source board.

(10) The frame member may at least include a frame portion extending along a periphery of the light guide plate, and light source holding portions disposed continuously from the frame portion and opposite the light entrance edge surface of the light guide plate to sandwich the light source from two sides thereof. The frame member bonding portion may be bonded to the mounting surface of the light source board and at least the light source holding portions of the frame member. According to such a configuration, the frame bonding portion is bonded to the light source holding portions that are continuous from the frame portion and provided opposite the light entrance edge surface of the light guide plate and hold the respective light source therebetween. Thus, the frame member is bonded to the light source board. If some of the light rays emitted by the light source is directed toward the side of the light source, the light rays can be absorbed by the light absorbing material contained in the light absorbing layers of the frame bonding portion. Therefore, unevenness in brightness is less likely to occur.

(11) The frame member bonding portion may be bonded to the mounting surface of the light source board, the light source holding portions and the frame portion of the frame member. According to such a configuration, a portion of the bonding member that is bonded to the opposite plate surface of the light guide plate is connected to a portion of the frame bonding portion of the bonding member bonded to the frame portion via the portions of the frame bonding portion that are to be bonded to the light source holding portions. Therefore, the bonding member has great strength. Further, the frame member and the light source board are held with greater bonding force.

(12) The bonding member may extend along the light entrance edge surface of the light guide plate, and the bonding member may include a portion overlapping the light source in an extending direction in which the bonding member extends and a portion not overlapping the light source. According to such a configuration, some of the light rays emitted by the light source that is directed toward the front side of the light source can be absorbed by portions of the light absorbing bonding layers overlapping the light source with respect to the extending direction thereof. Some of the light rays emitted by the light source and traveling obliquely with respect to the front side of the light source can be absorbed by the portions of the light absorbing bonding layers not overlapping the light source with respect to the extending direction thereof. Accordingly, unevenness in brightness is less likely to be caused.

(13) The light guide plate may have a substantially circular outline and the light source board may extend in a circumferential direction of the light guide plate and have a substantially arched shape. The bonding member may include a linear portion at a portion thereof overlapping the light source with respect to the circumferential direction of the light guide plate, the linear portion may extend linearly and cross the circumferential direction. The amount of the light rays emitted by the light source and traveling toward the light guide plate tends to be reduced as is farther away from the middle of the light source with respect to the circumferential direction of the light guide plate. The bonding member has the linear portion that is an overlap area overlapping the light source with respect to the circumferential direction of the light guide plate and the linear portion extends linearly to cross the circumferential direction. The overlap area in which the light guide plate and the linear portion are overlapped is reduced as is farther away from the middle of the light source with respect to the extending direction of the linear portion and this tendency is same as a distribution of the amount of light rays emitted by the light source and travelling toward the light guide plate. Thus, the light rays are effectively absorbed by the middle portion of the linear portion in the middle of the light source with respect to the circumferential direction of the light guide plate and the light rays are less likely to be absorbed by end portions of the linear portion in the end portions of the light source with respect to the circumferential direction. Accordingly, unevenness in brightness is less likely to be caused in the circumferential direction of the light guide plate.

Next, to solve the above problem, a display device includes the above lighting device and a display panel displaying images using light from the lighting device. According to the display device having such a configuration, the unevenness in brightness of exit light from the lighting device is less likely to be caused and the frame width of the lighting device is reduced. Therefore, the display quality of images displayed on the display panel is improved and design of the display device is improved.

Advantageous Effect of the Invention

According to the present invention, unevenness in brightness is less likely to occur.

MODES FOR CARRYING OUT THE INVENTION

First Embodiment

Figure 1:
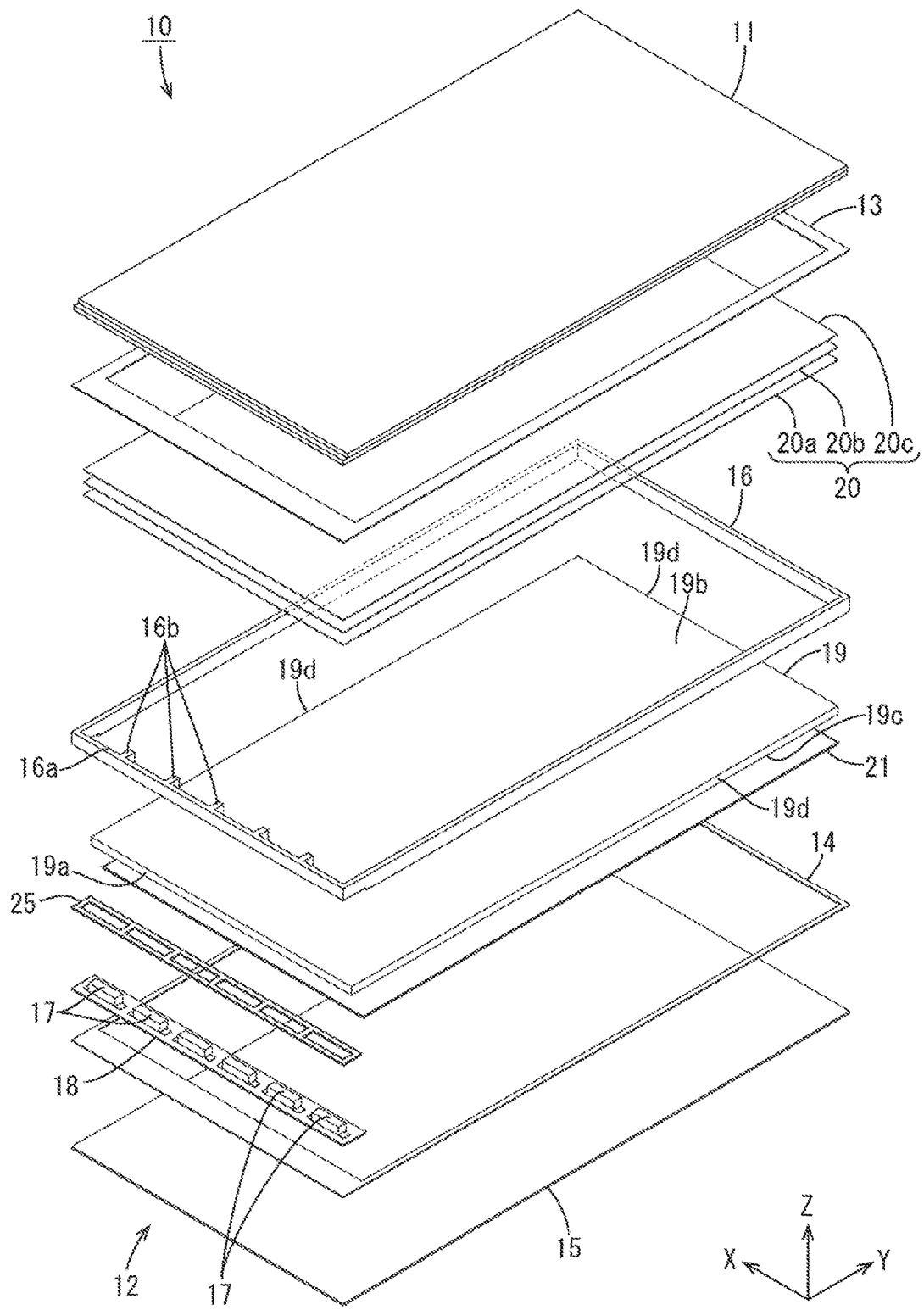
FIG. 1 is an exploded perspective view illustrating a liquid crystal display device according to a first embodiment of the present invention.

A first embodiment of the present technology will be described with reference to FIGS. 1 to 9. In this embodiment, a liquid crystal display device 10 including a liquid crystal panel 11 as a display panel will be described as an example. X-axis, Y-axis and Z-axis may be present in the drawings and each of the axial directions represents a direction represented in each drawing. A vertical direction is referred to FIG. 2 and an upper side and a lower side in FIG. 2 correspond to a front side and a back side, respectively.

As illustrated in FIG. 1, the liquid crystal display device 10 has a rectangular shape as a whole and includes a liquid crystal panel (display panel) 11 displaying images thereon and a backlight device (a lighting device) 12 that is arranged behind the liquid crystal panel and is an external light source supplying light to the liquid crystal panel 11. A frame-shaped bezel, which is not illustrated, may be arranged on the front side of the liquid crystal panel 11 such that a peripheral portion of the liquid crystal panel 11 (a non-display area NAA which will be described later) is held between the bezel and the backlight device 12. The liquid crystal panel 11 may be covered with a touch panel or a cover panel, which are not illustrated, from the front side. The liquid crystal display device 10 according to this embodiment is used in portable electronic devices such as smart phones and tablet-type laptop computers, and the display size is approximately from four inches to twenty inches.

Figure 2:
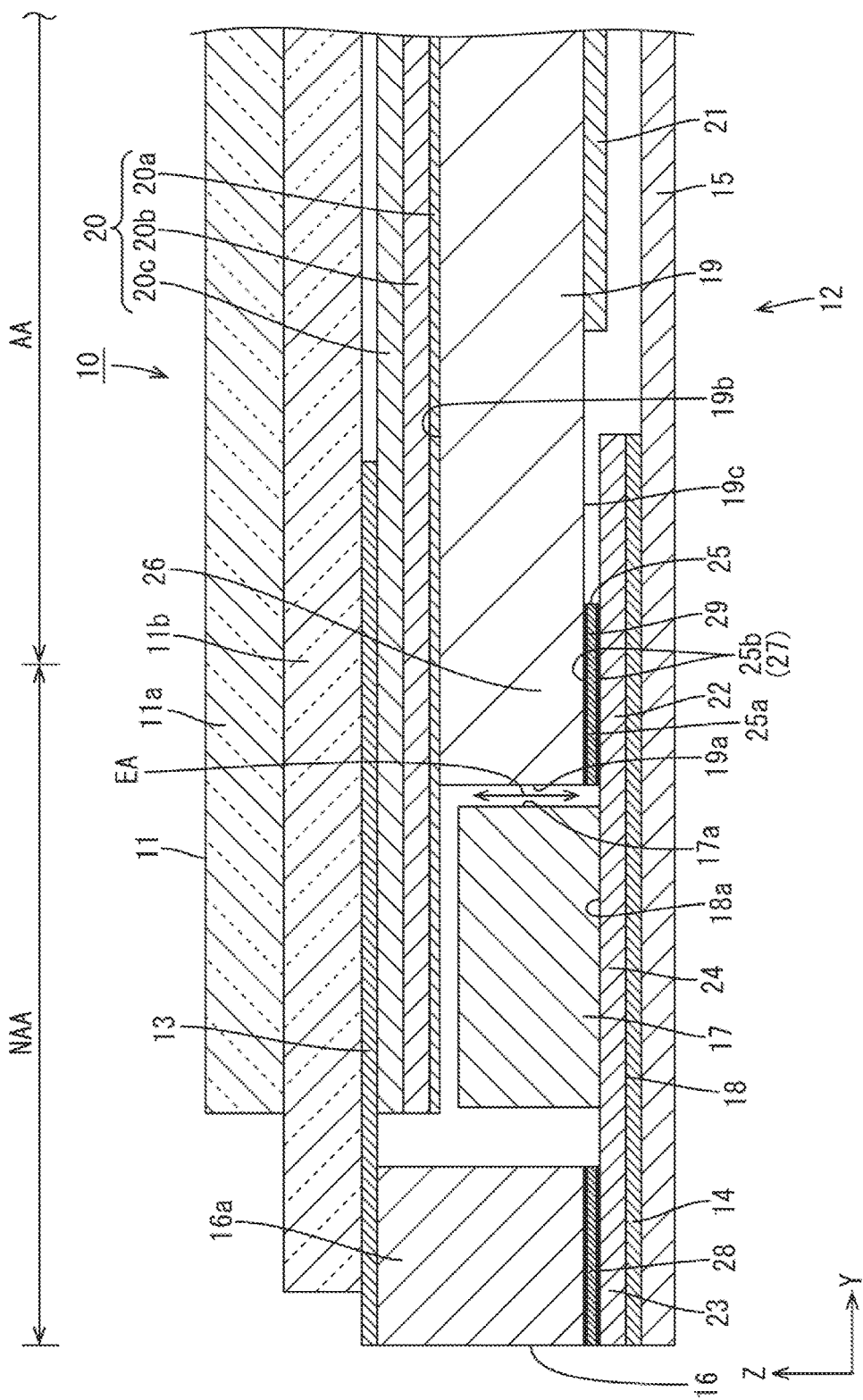
FIG. 2 is a side cross-sectional view of the liquid crystal display device.

The liquid crystal panel 11 will be described in detail. The liquid crystal panel 11 has a rectangular plan view shape. As illustrated in FIGS. 1 and 2, the liquid crystal panel 11 includes a pair of glass substrates 11a, 11b and a liquid crystal layer (not illustrated) that is between the glass substrates 11a and 11b. The glass substrates 11a, 11b are substantially transparent have excellent transmissivity. The liquid crystal layer contains liquid crystal molecules whose optical properties are altered according to application of electric field. The substrates 11a, 11b are bonded with a sealing agent, which is not illustrated, while having a gap of a thickness of the liquid crystal layer therebetween. One of the glass substrates 11a, 11b included in the liquid crystal panel 11 on the front (a front surface side) is a CF board 11a and another one on the rear (a rear surface side) is an array board 11b. A flexible printed board (not illustrated) has one edge portion that is connected to a signal supply source (such as a control board, which is not illustrated) and another edge portion that is connected to the array board 11b. Accordingly, various signals are supplied from the signal supply source to the array board 11b. Polarizing plates, which are not illustrated) are bonded to outer surfaces of the substrates 11a, 11b, respectively. In the liquid crystal panel 11, a short-side direction of corresponds to the Y-axis direction, a long-side direction corresponds to the X-axis direction, and a thickness direction corresponds to the Z-axis direction.

An internal configuration of the liquid crystal panel 11 in the display area AA (not illustrated) will be described. On an inner surface of the array substrate 11b (on a surface close to the liquid crystal layer, on a surface opposite the CF board 11a), switching components such as thin film transistors (TFTs) and pixel electrodes are arranged in a matrix. Gate lines and source lines that form a grid are arranged to surround the TFTs and the pixel electrodes. Signals relating images are supplied to the gate lines and the source lines from the signal supply source. The pixel electrode that is arranged in a square area defined by the gate lines and the source lines is formed of a transparent electrode such as indium tin oxide (ITO) or zinc oxide (ZnO). Color filters are arranged on the CF board 11a corresponding to the pixels. The color filters include three colors of red (R), green (G), blue (B) arranged alternately. A light blocking layer (a black matrix) is disposed between the coloring filters such that mixing of colors is less likely to be caused. A counter electrode is disposed on surfaces of the color filters and the light blocking layer to be opposite the pixel electrodes on the array board 11b. The CF board 11a is slightly smaller than the array board 11b. Alignment films are disposed on inner surfaces of the boards 11a, 11b, respectively, to align the liquid crystal molecules contained in the liquid crystal layer.

Next, a configuration of the backlight device 12 will be described in detail. The backlight device 12 has a substantially rectangular block shape in a plan view as a whole similar to that of the liquid crystal panel 11. As illustrated in FIG. 1, the backlight device 12 includes at least a chassis (casing) 15, a frame (a frame member) 16 arranged in the chassis 15, the LEDs (light emitting diodes) 17 as a light source, an LED board (a light source board) 18 on which the LEDs 17 are mounted, and a light guide plate 19 that guides light rays from the LEDs 17. The backlight device 12 includes the LEDs 17 (the LED board 18) at one of long edges of the backlight device 12 and the liquid crystal panel 11. Thus, the backlight device 12 of this embodiment is an edge light type (a side-light type) backlight device of one-side light entering type in which light from the LEDs 17 enter the light guide plate 19 through only one side. Next, components included in the backlight device 12 will be described in detail.

The chassis 15 is made of metal such as an aluminum plate or an electrogalvanized steel plate (SECC) and as illustrated in FIGS. 1 and 2, the chassis 15 has a rectangular plan view shape similar to that of the liquid crystal panel 11. The chassis 15 includes a plate surface that is parallel to plate surfaces of the liquid crystal panel 11, the light guide plate 19, and the optical sheet 20, respectively. In the chassis 15, a long-side direction matches the Y-axis direction and a short-side direction matches the X-axis direction.

Figure 3:
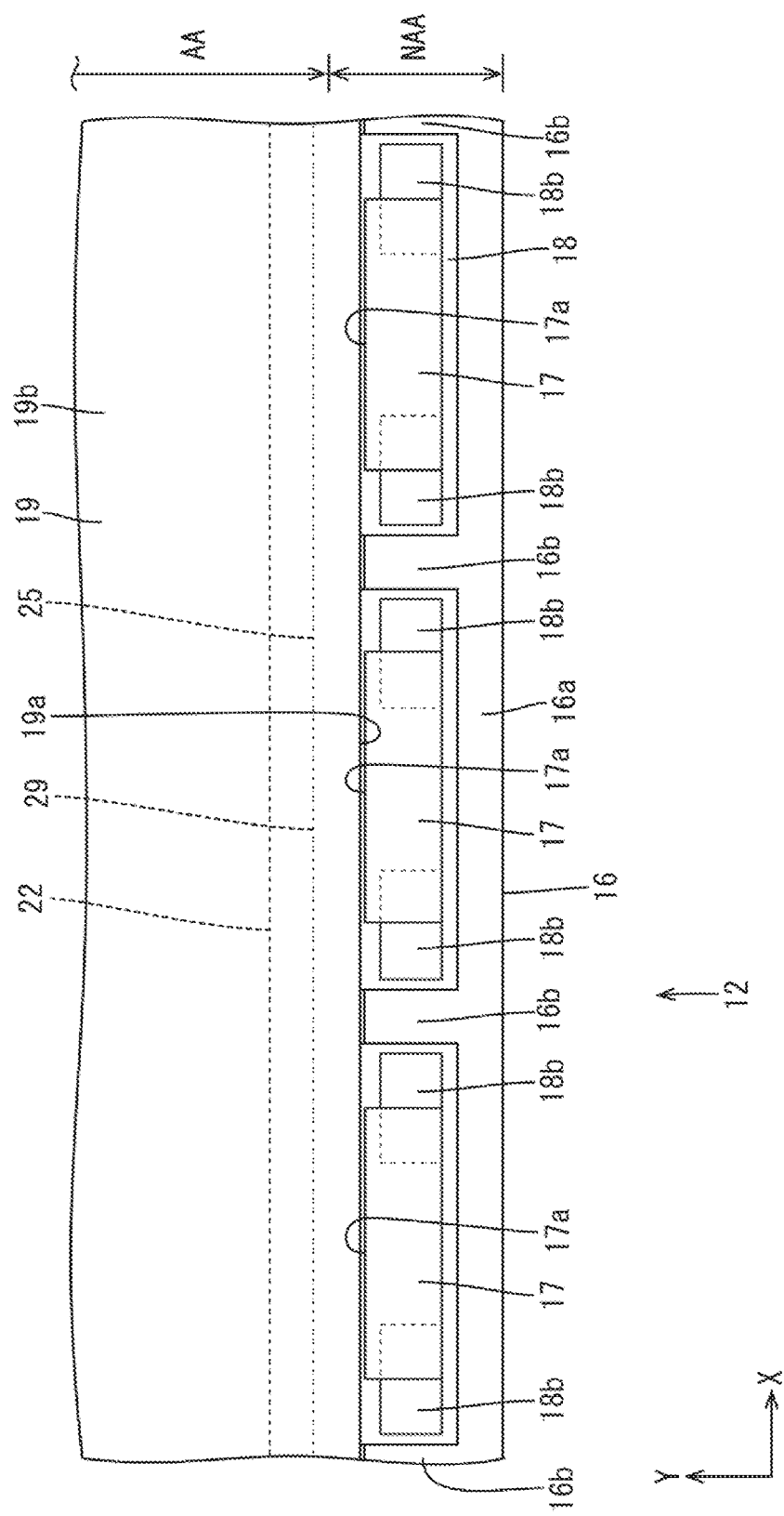
FIG. 3 is a plan view illustrating a part of a backlight device included in the liquid crystal display device near an LED board.

The frame 16 is made of synthetic resin. As illustrated in FIGS. 1 and 2, the frame 16 includes a frame portion having an outline slightly greater than that of the light guide plate 19 and the frame 16 is disposed to surround the light guide plate 19 from a peripheral portion thereof. The frame portion 16a has a rectangular plan view frame shape as a whole (seen from a normal direction of a plate surface of the light guide plate 19) and includes a pair of long-side portions extending in the Y-axis direction and a pair of short-side portions extending in the X-axis direction. The long-side portions and the short-side portions are connected to each other. As illustrated in FIGS. 2 and 3, one of the short-side portions of the frame portion 16a overlaps the LED board 18 in a plan view. The short-side portion of the frame portion 16a overlapping the LED board 18 (a light source board overlapping portion) includes LED holding portions (light source holding portion) 16b. The LED holding portions 16b project toward the light guide plate 19 in the Y-axis direction (a normal direction of the light entrance edge surface 19a) and hold the LED 17 from two sides thereof with respect to the X-axis direction (an extending direction of the light entrance edge surface 19a). The LED holding portion 16b projects from the frame portion 16a and has a projected distal end surface that is opposite the light entrance edge surface 19a of the light guide plate 19 and be able to be in contact with the light entrance edge surface 19a. Therefore, if the light guide plate 19 is thermally expanded, the light entrance edge surface 19a is contacted with each LED holding portion 16b such that the light guide plate 19 is less likely to be expanded further toward the LEDs 17 therefrom. Thus, the light guide plate 19 is less likely to be in contact with the LEDs 17.

As illustrated in FIGS. 1 and 2, the frame 16 having such a configuration is bonded to the liquid crystal panel 11 with a panel bonding member 13. The panel bonding member 13 has a rectangular plan view frame shape similar to that of the frame 16. The panel bonding member 13 includes a base member and bonding material coated on front and rear surfaces of the base member. The panel bonding member 13 is disposed between the frame 16 and the liquid crystal panel 11 with respect to the Z-axis direction. The adhesive material on the rear side of the base member is bonded to the front side surface of the frame 16 and the bonding material on the front side is bonded to the rear side surface of the liquid crystal panel 11. The panel bonding member 13 is disposed between the optical sheet 20, which will be described later, and the liquid crystal panel 11 with respect to the Z-axis direction and bonded to the optical sheet 20. The frame 16 is bonded to the chassis 15 together with the LED board 18, which will be described later, via a chassis bonding member 14. The chassis bonding member 14 has a rectangular plan view frame shape similar to that of the frame 16. The chassis bonding member 14 includes a base member and bonding material coated on front and rear surfaces of the base member. The chassis bonding member 14 has a short-side portion that is bonded to the LED board 18 and is wider than other three side portions.

As illustrated in FIGS. 1 to 3, each LED 17 includes a LED chip (an LED element) that is a semiconductor light emitting element and is sealed with resin material on a base board that is bonded to a plate surface of the LED board 18. The LED chip mounted on the base board has single main light emission wavelength and specifically the LED chip that emits light rays of a single color of blue is used. Phosphors that are excited by the blue light from the LED chip and emit light of a predefined color are dispersed in the resin material sealing the LED chip. The LED chip emits substantially white light as a whole. Each LED 17 is a so-called side-surface-emitting type LED and a side surface of the LED 17 adjacent to a mounting surface that is mounted on the LED board 18 is a light emission surface 17a.

As illustrated in FIGS. 1 to 3, the LED board 18 is formed of a flexible film (sheet) made of insulating material. The LED board 18 is arranged such that a plate surface thereof is parallel to plate surfaces of the liquid crystal panel 11, the chassis 15, the light guide plate 19, and the optical sheet 20. The LEDs 17 are surface-mounted on a front-side plate surface of the LED board 18 (a plate surface opposite the frame 16 and the light guide plate 19) and the surface of the LED board 18 is a mounting surface 18a. A soldering portion 18b and a tracing pattern (not illustrated) for supplying power to the LEDs 17 are formed with patterning on the mounting surface 18a of the LED board 18. As illustrated in FIG. 2, the LED board 18 is disposed on the rear side (on an opposite plate surface 19c side) of the frame 16 and the light guide plate 19 with respect to the Z-axis direction and is disposed between the chassis 15 and each of the frame 16 and the light guide plate 19.

As illustrated in FIGS. 1 to 3, the LED board 18 has a horizontally elongated rectangular shape having a length dimension (a long-side dimension) and a width dimension (a short-side dimension). The length dimension is substantially same as or slightly greater than a short-side dimension of the light guide plate 19. The width dimension is greater than a distance (a space) between the light entrance edge surface 19a of the light guide plate 19 and the frame portion 16a of the frame 16. The LED board 18 includes a light guide plate overlapping portion 22 on one edge portion thereof with respect to the width direction (the short-side direction, the Y-axis direction) and a frame overlapping portion (a frame portion overlapping portion) 23 on another edge portion thereof. The light guide plate overlapping portion 22 overlaps a part of the light guide plate 19 (including the light entrance edge surface 19a) in a plan view. The frame overlapping portion 23 overlaps the frame portion 16a in a plan view. Namely, a portion of the LED board 18 between the light guide plate overlapping portion 22 and the frame overlapping portion 23 is an LED mounting portion (a light source mounting portion) 24 where the LEDs 17 are mounted. As illustrated in FIG. 3, the LED mounting portions 24 are included on the LED board 18 at intervals with respect to a longitudinal direction (the long-side direction, the X-axis direction) and the soldering portions 18b in a pair are arranged on each of the LED mounting portions 24. The LEDs 17 (six LEDs in FIG. 1) mounted on the LED mounting portion 24 are arranged on the LED board 18 at intervals in the longitudinal direction of the LED board 18 and the adjacent LEDs 17 are connected in series via the tracing patterns. The interval between the adjacent LEDs 17 is constant and the LEDs 17 are arranged at substantially equal intervals in the X-axis direction. The LEDs 17 that are adjacent in the X-axis direction are separated from each other by the LED holding portions 16b of the frame 16. The LEDs 17 and the LED holding portions 16b are alternately arranged in the X-axis direction. The frame overlapping portion 23 includes a portion overlapping the frame portion 16a of the frame 16 and a portion overlapping each LED holding portion 16b, and has a comb teeth plan view shape as a whole. The light guide plate overlapping portion 22 has a belt-like shape extending substantially straight in the X-axis direction. The LED board 18 is supplied with power for lighting the LEDs 17 from a LED driving circuit board, which is not illustrated, and routing traces (not illustrated) for the supplying of power are formed on the LED board 18.

As illustrated in FIG. 1, the light guide plate 19 has a rectangular plate shape slightly smaller than an inner size of the frame 16 in a plan view. The light guide plate 19 has a plate surface that is parallel to plate surfaces of the liquid crystal panel 11, the chassis 15, the LED board 18, and the optical sheet 20 and in the plate surface of the light guide plate 19, the long-side direction matches the Y-axis direction and the short-side direction matches the X-axis direction and a thickness direction perpendicular to the plate surface matches the Z-axis direction. The light guide plate 19 is arranged directly below the liquid crystal panel 11 and the optical sheet 20 within the chassis 15 so as to be surrounded by the frame 16. A left-side short-side edge surface of the peripheral edge surfaces of the light guide plate 19 in FIG. 1 is the light entrance edge surface (a light source opposite edge surface) 19a through which light rays from the LEDs 17 enter. Three peripheral edge surfaces of the light guide plate 19 other than the light entrance edge surface 19b (a right-side short-side edge surface and a pair of long-side edge surfaces) are LED non-opposed edge surfaces (light source non-opposed edge surfaces) 19d. The light rays emitted by the LEDs 17 do not directly enter through the LED non-opposed edge surfaces. However, the light rays from the LEDs 17 may indirectly enter through the LED non-opposed edge surfaces.

As illustrated in FIG. 2, one of the front and rear side plate surfaces of the light guide plate 19 facing the front side (the liquid crystal panel 11 side) is the light exit plate surface 19b through which the light rays exit toward the liquid crystal panel 11. The other plate surface facing the rear side (the chassis 15 side) is the opposite plate surface 19c that is opposite from the light exit plate surface 19b. According to such a configuration, the LEDs 17 and the light guide plate 19 are arranged in the Y-axis direction and the optical sheet 20 (the liquid crystal panel 11) and the light guide plate 19 are arranged in the Z-axis direction. The arrangement directions are perpendicular to each other. The light rays emitted by the LEDs 17 in the Y-axis direction enter the light guide plate 19 through the light entrance edge surface 19a and the light rays travel within the light guide plate 19 toward the optical member 20 (toward the front side, the light exit side) and exits the light guide plate 19 through the light exit plate surface 19b that is the front side plate surface. A light reflecting pattern (not illustrated) is formed on the opposite plate surface 19c of the light guide plate 19 for reflecting the light rays inside the light guide plate 19 toward the light exit plate surface 19b to accelerate the light rays exiting through the light exit plate surface 19b. The light reflecting pattern includes light reflectors. The light reflectors in the light reflecting pattern are light reflecting dots with a distribution density that changes according to a distance from the light entrance edge surface 19a (the LEDs 17). Specifically, the distribution density of the light reflecting dots of the light reflectors is increased as the distance from the light entrance edge surface 19a in the Y-axis direction increases. The distribution density is decreased as the distance to the light entrance edge surface 19a decreases. According to the configuration, the light rays from the light exit plate surface 19b are evenly distributed within a plane.

As illustrated in FIGS. 1 and 2, the optical sheet 20 has a rectangular plan view shape similar to that of the light guide plate 19. The plate surface of the optical sheet 20 is parallel to the plate surfaces of the liquid crystal panel 11, the chassis 15, the LED board 18, and the light guide plate 19. In the plate surface, the long-side direction matches the Y-axis direction, the short-side direction matches the X-axis direction, and the thickness direction perpendicular to the plate surface matches the Z-axis direction. The optical sheet 20 is disposed on the light exit plate surface 19b of the light guide plate 19 on the front side and between the liquid crystal panel 11 and the light guide plate 19. With such a configuration, the exit light rays from the light guide plate 19 pass through the optical sheet 20 and the transmission light rays exit the light guide plate 19 toward the liquid crystal panel 11 while predefined optical effects are exerted on the transmission light by the optical sheet 20. As illustrated in FIG. 2, a short-side edge surface on the LED 17 side (a light source side edge surface) of the peripheral edge surfaces of the optical sheet 20 projects toward the outside (toward the LED 17 side) than the light entrance edge surface 19a of the light guide plate 19. In this embodiment, the optical sheet 20 includes three optical sheets laminated with each other. Specifically, the three optical sheets include a diffuser sheet 20a, a first prism sheet 20b, and a second prism sheet 20c. The diffuser sheet 20a is disposed closest to the rear side and directly on the light exit plate surface 19b of the light guide plate 19. The first prism sheet 20b is disposed on the front side of the diffuser sheet 20a and the second prism sheet 20c is disposed on the front side of the first prism sheet 20b. The diffuser sheet 20a includes a base member and diffuser particles dispersedly contained in the base member, and the diffuser sheet 20a is configured to disperse the light rays transmitting therethrough. Each of the first prism sheet 20b and the second prism sheet 20c includes a base member and a prism portion included on the front-side plate surface of the base member. The prism portion includes unit prisms each extending in the X-axis direction or the Y-axis direction, and the unit prisms are arranged in the Y-axis direction or the X-axis direction. The transmission light is refracted by the unit prisms included in the prism portion such that light collecting effects are exerted on the light selectively with respect to the arrangement direction of the unit prisms. The extending direction and the arrangement direction of the unit prisms of the first prism sheet 20b are perpendicular to the extending direction and the arrangement direction of the unit prisms of the second prism sheet 20c, respectively.

As illustrated in FIGS. 1 and 2, the reflection sheet 21 is disposed on the opposite plate surface 19c of the light guide plate 19 on the side opposite from the light exit plate surface 19b to cover the opposite plate surface 19c on the rear side. The reflection sheet 21 is a sheet member made of synthetic resin including a white surface having high light reflectivity. The reflection sheet 21 reflects light rays traveling through the light guide plate 19 to direct the light rays toward the front side (toward the light exit plate surface 19b). The reflection sheet 21 has a rectangular plan view shape similar to that of the light guide plate 19 and a middle portion of the reflection sheet 21 is between the light guide plate 19 and the chassis 15.

The LED board 18 and the light guide plate 19 having the above configurations are bonded to each other via the bonding member 25, which will be described below. As illustrated in FIG. 2, the bonding member 25 is bonded to the mounting surface 18a of the light guide plate overlapping portion 22 of the LED board 18 and a light entrance side edge portion 26 of the light guide plate 19 including the light entrance edge surface 19a. The bonding member 25 includes light absorbing bonding layers 27 made of bonding material and light absorbing material contained therein. According to such a configuration, the bonding member 25 is between the mounting surface 18a of the light guide plate overlapping portion 22 of the LED board 18 and the opposite plate surface 19c of the light entrance side edge portion 26 of the light guide plate 19 and thus, a space is less likely to be generated between them. Further, the light rays emitted by the LEDs 17 are absorbed by the light absorbing material contained in the light absorbing bonding layers 27 such that the light rays emitted by the Les 17 are less likely to transmit through the bonding member 25. Accordingly, light is less likely to leak through a portion between the light guide plate overlapping portion 22 and the light entrance side edge portion 26 and therefore, a bright portion is less likely to be locally produced due to the leaking light. Thus, unevenness in brightness is less likely to be caused in a portion of the light guide plate 19 near the LEDs 17. According to less occurrence of unevenness in brightness in a portion of the light guide plate 19 near the LEDs 17, the light rays exiting through the light exit plate surface 19b can be effectively used in a wide range and the frame width of the backlight device 12 can be optimally reduced. In FIG. 2, the light absorbing bonding layers 27 are illustrated with thick lines.

Figure 4:
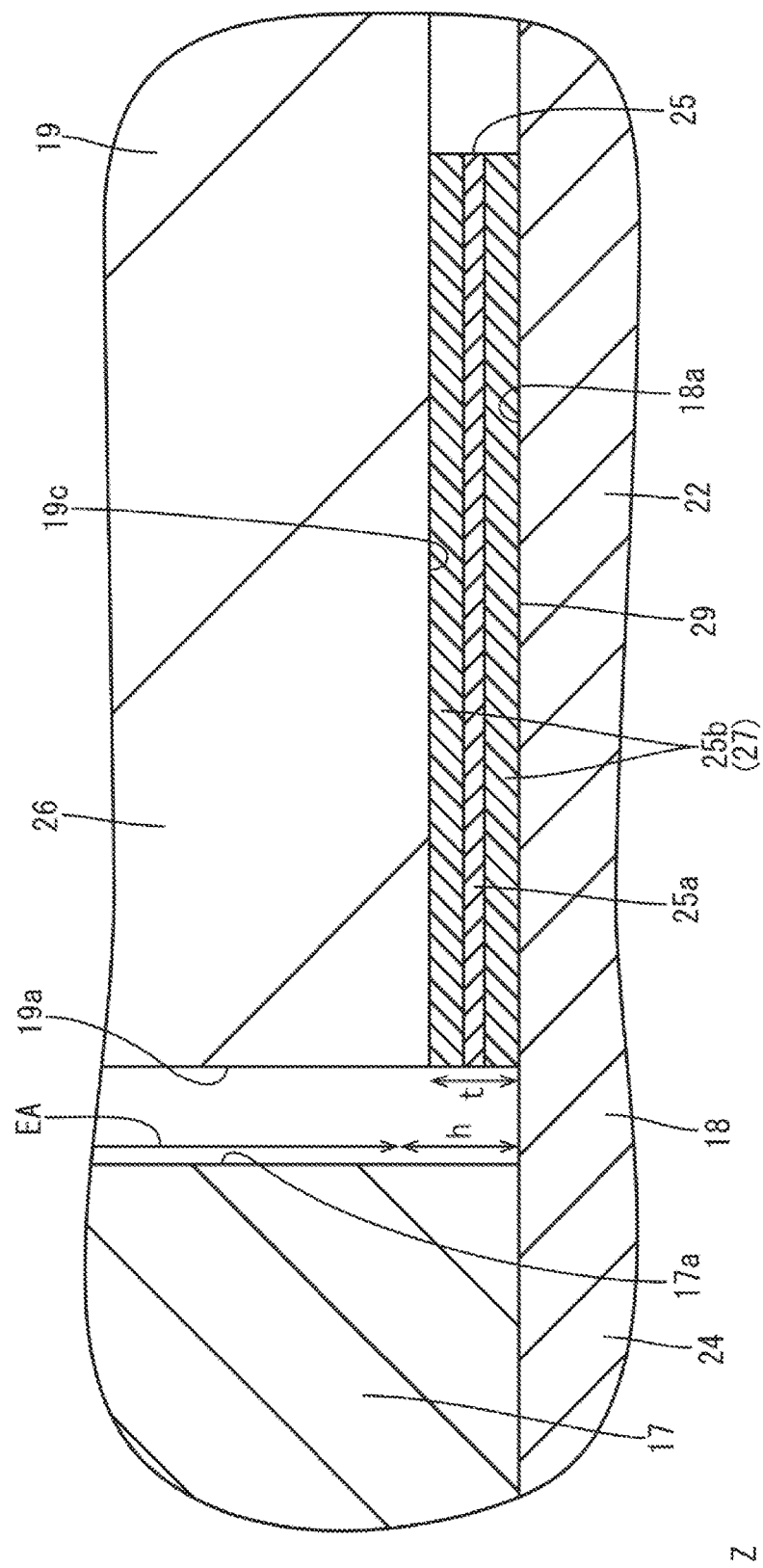
FIG. 4 is a side cross-sectional view illustrating a part of a backlight device near the LED board.

As illustrated in FIG. 4, the bonding member 25 includes a base member 25a and a pair of bonding layers 25b. The base member 25a is a film formed to follow the mounting surface 18a of the LED board 18 and the opposite plate surface 19c of the light guide plate 19. The bonding layers 25b are formed on front and rear surfaces of the base member 25a, respectively. With such a bonding member 25, the LED board 18 and the light guide plate 19a are optimally held each other. The base member 25a is a film made of synthetic resin such as polyethylene terephthalate (PET) and has a thickness of from 1 μm to 100 μm, for example, and preferably approximately 12 μm. The base member 25a exhibits black having good light absorbing properties. Specifically, coloring material (light absorbing material) such as black ink may be printed on a surface of the base member 25a or black pigments (light absorbing material) may be dispersed in the base member 25a. The base member 25a containing the light absorbing material that absorbs light can absorb the light emitted by the LEDs 17 together with the light absorbing bonding layers 27. Accordingly, unevenness in brightness is further less likely to be caused. Specifically, a greatest value of light transmittance of visible light in the base member 25a is preferably 1% or less.

As illustrated in FIG. 4, the pair of bonding layers 25b are formed of bonding material such as synthetic resin having an adhesive property (for example, acrylic resin material) and thickness thereof is 50 μm or less, for example, and preferably approximately 20 μm. Namely, each of the bonding layers 25b (each light absorbing bonding layer 27) is thicker than the base member 25a and has great bonding force. Each of the bonding layers 25b exhibits black having good light absorbing properties similarly to the base member 25a. Specifically, light absorbing material such as black pigments may be dispersed in the bonding material. Namely, both of the bonding layers 25b disposed on the front and rear surfaces of the base member 25a are the light absorbing bonding layers 27. Thus, both of the bonding layers 25b are the light absorbing bonding layers 27. Therefore, some of the light rays emitted by the LEDs 17 and directed to the portion between the opposite plate surface 19b of the light guide plate 19 and the base member 25a can be efficiently absorbed by the light absorbing material contained in the light absorbing bonding layers 27 included in the front-side bonding layer 25b. Further, some of the light rays emitted by the LEDs 17 and directed to the portion between the base member 25a and the mounting surface 18a of the LED board 18 can be efficiently absorbed by the light absorbing material contained in the light absorbing bonding layers 27 included in the rear-side bonding layer 25b. Thus, the unevenness in brightness is further less likely to be caused. Further, each of the light absorbing bonding layers 27 is thicker than the base member 25a and therefore, the light rays emitted by the LEDs 17 can be effectively absorbed by the light absorbing material contained in the light absorbing bonding layer 27. Specifically, a greatest value of light transmittance of visible light in each of the light absorbing bonding layers 27 is preferably 25% or less. Carbon black is preferably used as the light absorbing material contained in each of the light absorbing bonding layers 27. Other than black carbon, organic black coloring agents (organic dye) such as reactive dye, azo dye, nigrosine dye, mixed-phase pigments ("solid-solution-pigment"), especially, aniline black, perylene black, brilliant black BN, reactive black 5, or sulfur black T may be used as the light absorbing material.

As illustrated in FIGS. 2 and 4, the LED 17 has an effective light emission area EA that is a middle portion of the light emission surface 17a opposite the light entrance edge surface 19a of the light guide plate 19 and except for the peripheral edge portion of the light emission surface 17a. The light rays are effectively emitted from the effective light emission area EA. The effective light emission area EA is a range that is surrounded by a frame-shaped peripheral edge portion of a predetermined width in a front view on the light emission surface 17a of the LED 17. A distance h between an outline of the effective light emission area EA and the mounting surface 18a of the LED board 18 is equal to a width dimension of the frame-shaped peripheral edge portion. The bonding member 25 has the thickness t that is smaller than the distance h. Therefore, the opposite plate surface 19c of the light guide plate 19 that is bonded to the bonding member 25 is located at a lower level than the outline of the effective light emission area EA with respect to the Z-axis direction. Accordingly, most of the light rays emitted from the effective light emission area EA of the light emission surface 17a of the LED 17 and directed in the normal direction of the light emission surface 17a enter the light guide plate 19 through the light entrance edge surface 19a. Therefore, the light rays are less likely to be directly in contact with the bonding member 25. Namely, most of the light rays emitted from the effective light emission area EA and reaching the bonding member 25 travels obliquely to the light emission surface 17a. Accordingly, the light rays emitted by the LEDs 17 are less likely to transmit through the light absorbing bonding layers 27 and the unevenness in brightness is further less likely to be caused.

As illustrated in FIG. 1, the bonding member 25 has a belt-like shape extending in the X-axis direction that is the extending direction of the light entrance edge surface 19a of the light guide plate 19 and the bonding member 25 has a length dimension substantially equal to the short-side dimension of the light guide plate 19 (a length dimension of the light entrance edge surface 19a). The bonding member 25 has a width dimension (a Y-axis dimension) that is smaller than a width dimension of the light guide plate overlapping portion 22 of the LED board 18 and is approximately a half of the width dimension of the light guide plate overlapping portion 22. As illustrated in FIG. 2, the bonding member 25 is disposed in a range extending from a position that is on a same plane as the light entrance edge surface 19a of the light guide plate 19 to a position on the LED board 18 that is on an inner side from the light guide plate 19 side edge of the LED board 18 with respect to the Y-axis direction (the arrangement direction of the LED 17 and the light guide plate 19). Namely, the bonding member 25 is disposed on a portion of the light guide plate overlapping portion 22 of the LED board 18 that is closer to the LED 17. According to such a configuration, the light rays emitted by the LED 17 and directed toward the portion between the opposite plate surface 19c of the light guide plate 19 and the mounting surface 18a of the LED board 18 are efficiently absorbed by the light absorbing material contained in the light absorbing bonding layers 27 of the bonding member 25 that is disposed on a same position as the light entrance edge surface 19a of the light guide plate 19 with respect to the Y-axis direction. Further, the light rays are less likely to be absorbed excessively by the light absorbing material contained in the light absorbing bonding layers 27 compared to a configuration that the bonding member extends to the light guide plate 19 side edge of the LED board 18 with respect to the Y-axis direction. Therefore, the brightness is less likely to be lowered.

As illustrated in FIG. 2, in addition to the LED board 18 and the light guide plate 19, the LED board 18 and the frame 16 are bonded to each other via the bonding member 25. Namely, the bonding member 25 includes a frame bonding portion (a frame portion bonding portion) 28 with which the frame 16 is bonded to the mounting surface 18a of the LED board 18. The frame 16 is held by the LED board 18 with the frame bonding portion 28. The number of parts is reduced compared to a configuration including another member for bonding the frame 16 to the mounting surface 18a of the LED board 18. A portion of the bonding member 25 except for the frame bonding portion 28 is a light guide plate bonding portion 29.

Figure 5:
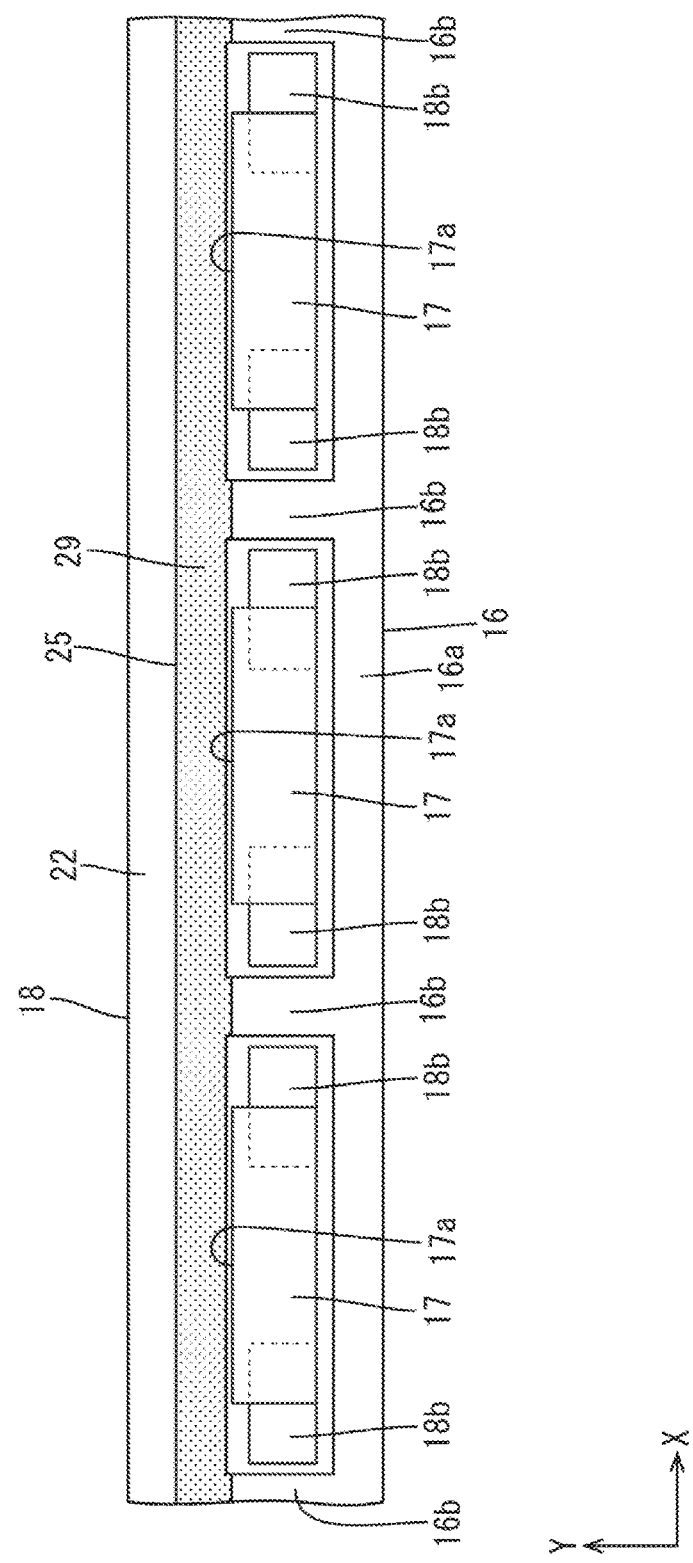
FIG. 5 is a plan view illustrating a frame, the LED board, and a bonding member.
Figure 6:
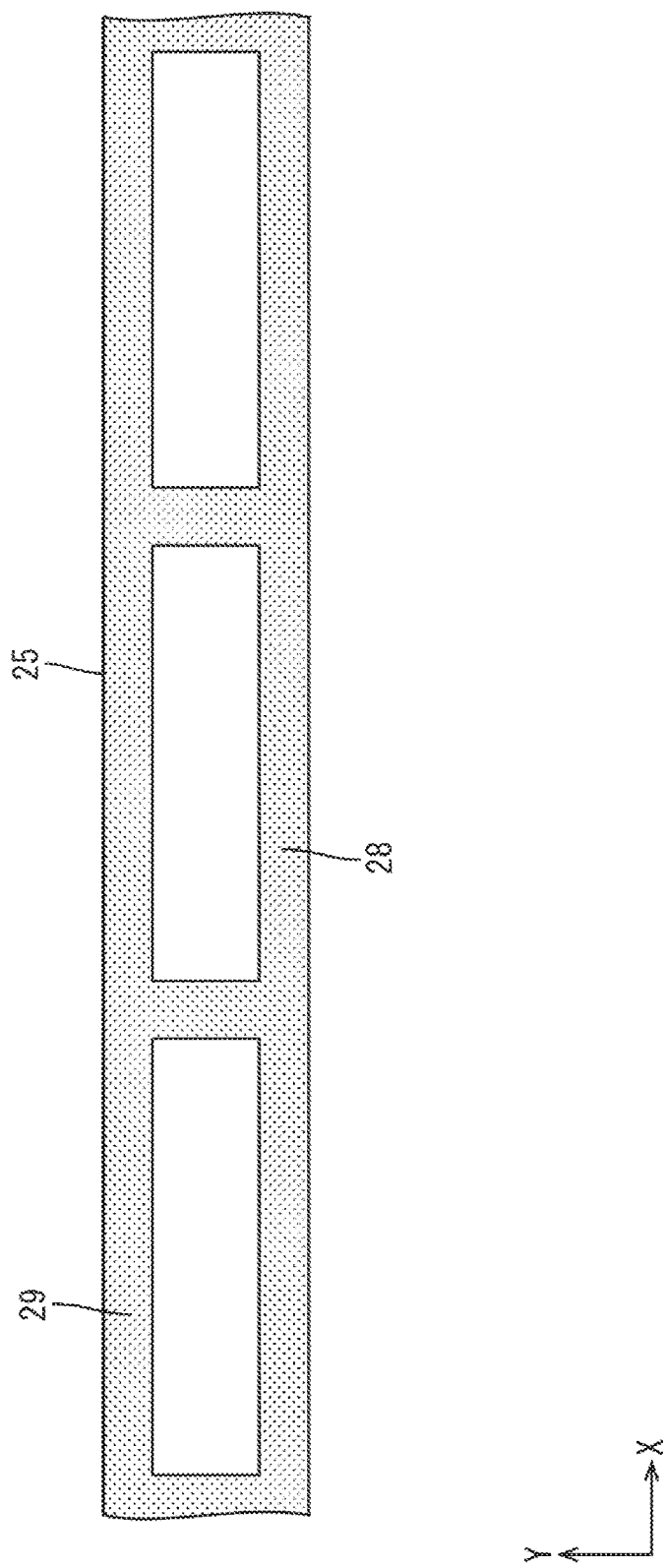
FIG. 6 is a plan view of the bonding member.
Figure 7:
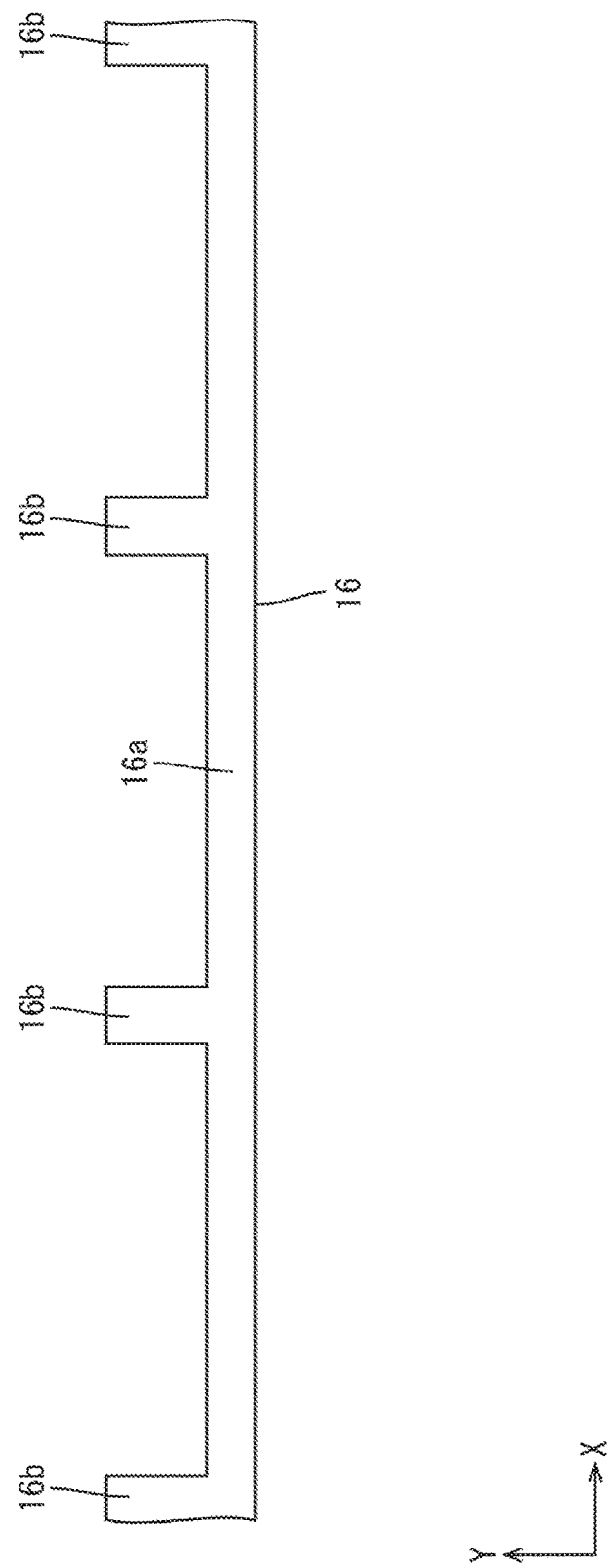
FIG. 7 is a plan view illustrating a part of the frame near an LED holding portion.

More specifically, as illustrated in FIGS. 5 and 6, the frame bonding portion 28 has a comb-teeth plan view shape that follows the shape of the frame overlapping portion 23 of the LED board 18. In FIGS. 5 and 6, the bonding member 25 is illustrated with shading. As illustrated in FIGS. 6 and 7, the frame bonding portion 28 has a plan view shape overlapping the short-side portion of the frame portion 16a of the frame 16 overlapping the LED board 18 and overlapping the LED holding portions 16b that are continuous from the short-side portion of the frame portion 16a. The light guide plate bonding portion 29 has a belt-like shape extending in the X-axis direction or along the light entrance side edge portion 26 of the light guide plate 19. Therefore, the bonding member 25 has a substantially ladder plan view shape as a whole, as illustrated in FIGS. 5 and 6. As described before, the frame bonding portion 28 is disposed on the frame portion 16a and the LED holding portions 16b of the frame 16 such that the frame 16 is bonded to the LED board 18 with great bonding force. If some of the light rays emitted by the LEDs 17 is directed toward a side that is in the X-axis direction with respect to the LEDs 17, the light rays directed toward the side can be absorbed by the light absorbing material contained in the light absorbing bonding layers 27 of the frame bonding portion 28 and therefore, unevenness in brightness is less likely to be caused. Further, in the bonding member, the light guide bonding portion 29 that is bonded to the opposite plate surface 19c of the light guide plate 19 is connected to the portion of the frame bonding portion 28 bonded to the frame portion 16a via the portions of the frame bonding portion 28 that are to be bonded to the LED holding portions 16b. Therefore, the bonding member 25 has great strength. The light guide plate bonding portion 29 of the bonding member 25 extends in the X-axis direction and includes portions overlapping the LEDs 17 and portions not overlapping the LEDs 17 with respect to the extending direction. Therefore, some of the light rays emitted by the LEDs 17 and directed toward the front side of the LED 17 can be absorbed by the light absorbing bonding layers 27 included in the portion of the light guide plate bonding portion 29 overlapping the LEDs 17 with respect to the extending direction thereof. Some of the light rays emitted by the LEDs 17 and traveling obliquely with respect to the front side of the LED 17 can be absorbed by the light absorbing bonding layers 27 included in the portions of the light guide plate bonding portion 29 not overlapping the LEDs 17 with respect to the extending direction thereof. Accordingly, unevenness in brightness is less likely to be caused.

Next, operations of this embodiment having the above configuration will be described. When the liquid crystal display device 10 is turned on, signals about images are supplied to the liquid crystal panel 11 from the signal supply source and a LED driver circuit board supplies power to the LEDs 17 on the LED board 18 to light on the LEDs 17. The light rays from the LEDs 17 travel within the light guide plate 19 and transmit through the optical sheet 20 such that the light rays are converted to even planar light. The planar light is supplied to the liquid crystal panel 11 and a specific image is displayed on the liquid crystal panel 11.

Operations of the backlight device 12 will be described in detail. When the LEDs 17 are turned on, the light rays emitted by the LEDs 17 enter the light guide plate 19 through the light entrance edge surface 19a as illustrated in FIG. 2. The light rays entering through the light entrance edge surface 19a may be totally reflected by the interface between the light guide plate 19 and the outside air layer or reflected by the reflection sheet 21 to travel through the light guide plate 19. The light rays transmitting through the light guide plate 19 exit through the light exit plate surface 19b and are directed toward the optical sheet 20. If a gap is produced between the mounting surface 18a of the LED board 18 and the opposite plate surface 19c of the light guide plate 19, the light rays emitted by the LEDs 17 may not pass through the light entrance edge surface 19a and may leak through the gap. The leaking light rays may exit through the light exit plate surface 19b and a bright portion is locally produced in a portion of the light guide plate 19 near the LEDs 17 and unevenness in brightness may be seen. In this embodiment, the bonding member 25 is bonded to the mounting surface 18a of the light guide plate overlapping portion 22 that is a part of the LED board 18 and the opposite plate surface 19c of the light entrance side edge portion 26 that is apart of the light guide plate 19 and the bonding member 25 includes the light absorbing bonding layers 27 including the bonding material that contains the light absorbing material. Therefore, a gap is less likely to be produced between the mounting surface 18a of the light guide plate overlapping portion 22 of the LED board 18 and the opposite plate surface 19c of the light entrance side edge portion 26 of the light guide plate 19. Further, the light rays emitted by the LEDs 17 are absorbed by the light absorbing material contained in the light absorbing bonding layers 27 such that the light rays emitted by the LEDs 17 are less likely to transmit through the bonding member 25. Accordingly, a bright portion is less likely to be locally produced in a portion of the light guide plate 19 near the LEDs 17 and unevenness in brightness is less likely to occur. According to less occurrence of unevenness in brightness in the portion of the light guide plate 19 near the LEDs 17, the light rays exiting through the light exit plate surface 19b can be effectively used in a wide range and the frame width of the backlight device 12 can be optimally reduced.

Figure 8:
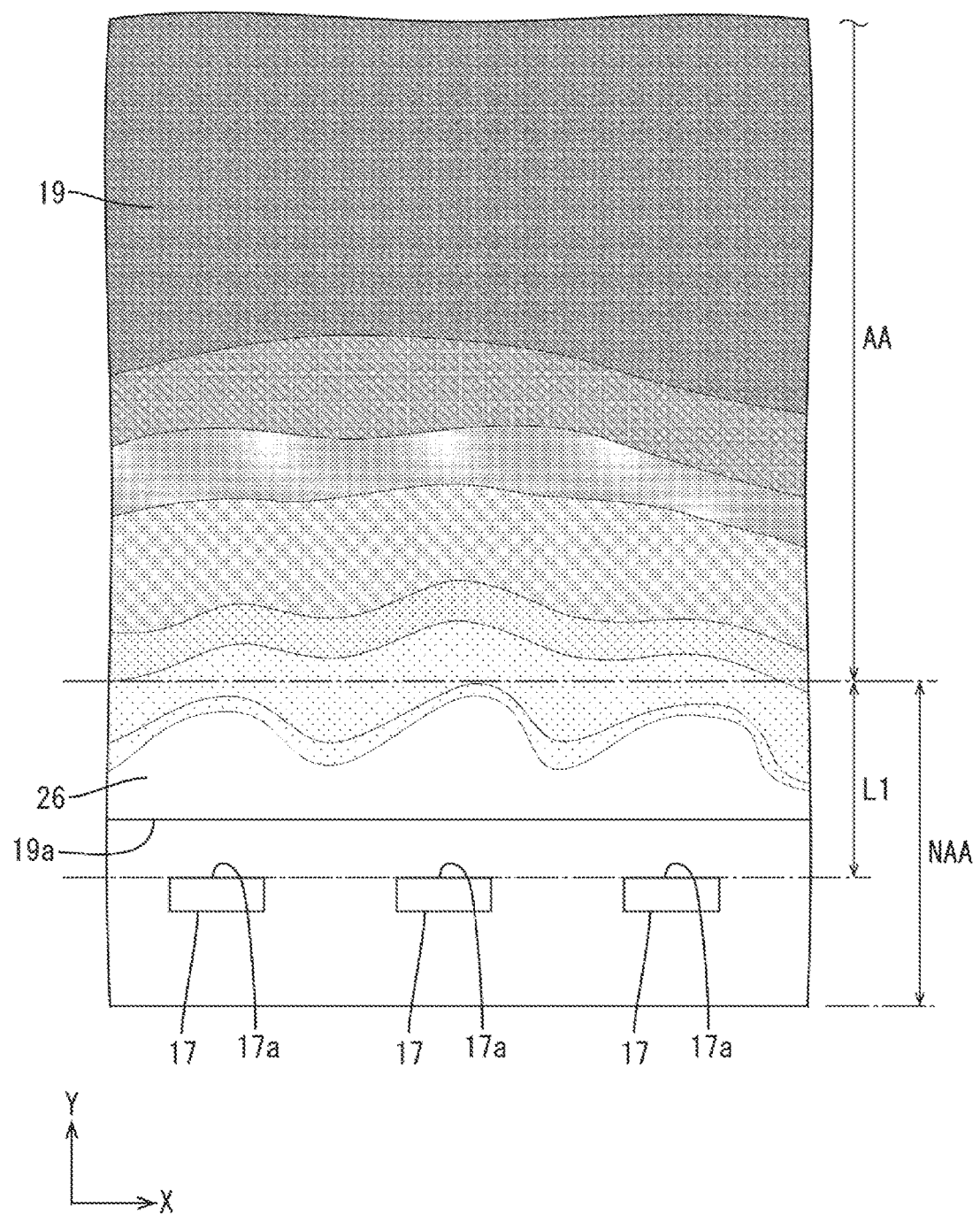
FIG. 8 is a plan view illustrating a brightness distribution within a light exit plate surface of a light guide plate according to Comparative Example of Comparative Experiment 1.
Figure 9:
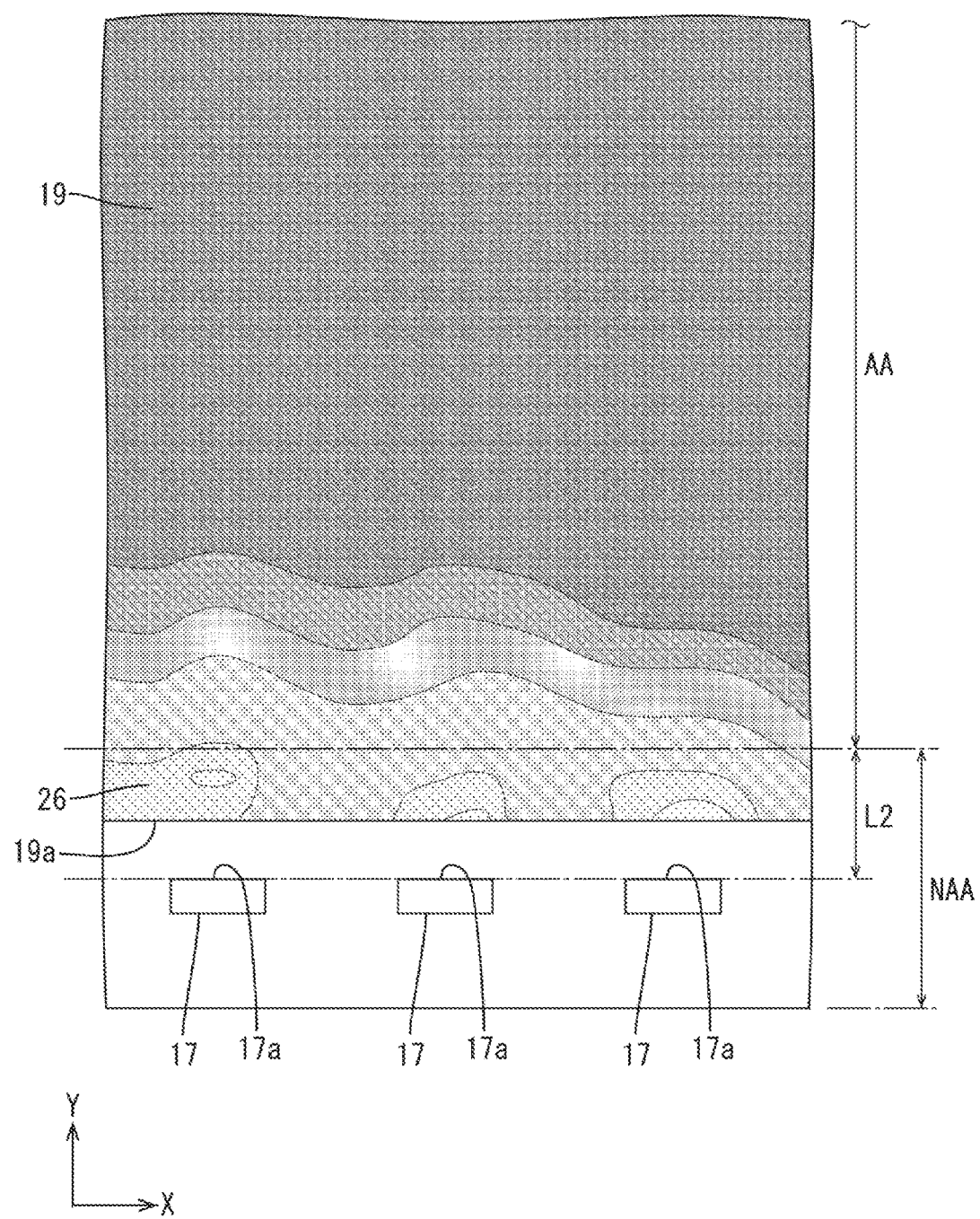
FIG. 9 is a plan view illustrating a brightness distribution within a light exit plate surface of a light guide plate according to Example 1 of Comparative Experiment 1.

Following Comparative Experiment 1 was executed to substantiate the above operations and effects. In Comparative Experiment 1, a backlight device without including the bonding member 25 was prepared in Comparative Example, and the backlight device 12 including the above described bonding member 25 was prepared in Example 1. A brightness distribution within a plane surface of the light exit plate surface 19b was measured when the LEDs 17 of each of the backlight devices in Comparative Example and Example 1. Experiment results of Comparative Experiment 1 are illustrated in FIGS. 8 and 9. In FIGS. 8 and 9, a density of dots is changed according to change of a brightness level that corresponds to an amount of light rays in a unit area of the light exit plate surface 19b. The brightness is lowered as the density of dots is increased, and the brightness is increased as the density of dots is lowered. No dot is in the area where the brightness is highest (an area closest to the LEDs 17 in FIG. 8). In FIGS. 8 and 9, approach distances L1 and L2 each of which is a distance from the light emission surfaces 17a of the LEDs 17 to the outline of the display area AA are illustrated. The approach distance L1, L2 represents a distance from the position where brightness unevenness is not recognized in the light rays exiting through the light exit plate surface 19b to the light emission surfaces 17a of the LEDs 17.

Experiment results of Comparative Experiment 1 will be described. As illustrated in FIG. 8, in the backlight device according to Comparative Example, brightness is extremely high in the portion of the light exit plate surface 19b closest to the LEDs 17 and near the light entrance side edge portion 26. Difference in brightness is great between the portion of the light exit plate surface 19b near the light entrance side edge portion 26 and a middle portion (having a highest dot density) of the light exit plate surface 19b where the brightness is low and stable. Therefore, in the backlight device in Comparative Example, the light rays exiting through the light exit plate surface 19b near the light entrance side edge portion 26 are less likely to be used for display over a wide range and the approach distance L1 is necessarily provided in a large area. In the backlight device 12 according to Example 1, as illustrated in FIG. 9, the brightness is not so high as that in Comparative Example in the portion of the light exit plate surface 19b closest to the LEDs 17 and near the light entrance side edge portion 26. Therefore, difference in brightness between the portion of the light exit plate surface 19b near the light entrance side edge portion 26 and the middle portion of the light exit plate surface 19b where the brightness is low and stable is smaller than that in Comparative Example. Accordingly, in the backlight device 12 according to Example 1, the light exit plate surface 19b near the light entrance side edge portion 26 includes an area where the light rays exit therethrough cannot be used for display, and the area is smaller than that in Comparative Example and the approach distance L2 can be smaller than the approach distance L1 of Comparative Example. In Example 1, the approach distance L2 is smaller than that of Comparative Example and therefore, the display area AA is increased and the non-display area NAA is decreased. The backlight device 12 according to Example 1 includes the bonding member 25 that is bonded to the mounting surface 18a of the light guide plate overlapping portion 22 of the LED board 18 and the opposite plate surface 19c of the light entrance side edge portion 26 of the light guide plate 19. Therefore, a gap is less likely to be produced between the surfaces 18a and 19a and the light rays emitted by the LEDs 17 are absorbed by the light absorbing material contained in the light absorbing bonding layers 27. Accordingly, a bright portion is less likely to be locally produced in the portion of the light guide plate 19 near the LEDs 17 and unevenness in brightness is less likely to occur. Thus, the display area AA is increased and the non-display area NAA is decreased and a frame width of the backlight device 12 and the liquid crystal display device 10 can be reduced.

As described before, the backlight device (the lighting device) 12 of this embodiment includes the LEDs (the light source) 17, the light guide plate 19, the LED board (the light source board) 18, and the bonding member 25. The light guide plate 19 includes the peripheral edge surfaces and a pair of plate surfaces. A part of the peripheral edge surfaces is the light entrance edge surface 19a through which light rays emitted by the LEDs 17 enter. One of the plate surfaces is the light exit plate surface 19b through which the light exits and the other one is the opposite plate surface 19c. The LED board 18 includes the mounting surface 18a on which the LEDs 17 are mounted and a part of the LED board 18 overlaps a part of the light guide plate 19 on the opposite plate surface 19c side. The bonding member 25 is bonded to the mounting surface 18a that is a part of the LED board 18 and bonded to the opposite plate surface 19c that is a part of the light guide plate 19. The bonding member 25 includes the light absorbing bonding layers 27 that include the bonding material and the light absorbing material contained in the bonding material.

According to such a configuration, the light rays emitted by the LEDs 17 enter the light guide plate 19 through the light entrance edge surface 19a and travel within the light guide plate 19 and then, exit through the light exit plate surface 19b. A part of the LED board 18 on which the LEDs 17 are mounted overlaps a part of the light guide plate 19 on the opposite plate surface 19c side. Therefore, if a gap is generated between the opposite plate surface 19c of a part of the light guide plate 19 and the LED board 18, light rays emitted by the LEDs 17 may leak through the gap. The leaking light rays may exit through the light exit plate surface 19b and unevenness in brightness may be seen in a portion of the light guide plate 19 near the LEDs 17. The bonding member 25 is bonded to the mounting surface 18a of a part of the LED board 18 and the opposite plate surface 19c of a part of the light guide plate 19 and the bonding member 25 includes the light absorbing bonding layers 27 formed of the bonding material and the light absorbing material contained in the bonding material. According to such a configuration, a gap is less likely to be generated between the mounting surface 18a of a part of the LED board 18 and the opposite plate surface 19c of a part of the light guide plate 19 and the light rays from the LEDs 17 are absorbed by the light absorbing material contained in the light absorbing bonding layers 27 such that the light rays from the LEDs 17 are less likely to transmit through the bonding member 25. Accordingly, the unevenness in brightness is less likely to occur in the portion of the light guide plate 19 near the LEDs 17. According to the less occurrence of the unevenness in brightness in the portion of the light guide plate 19 near the LEDs 17, the light rays exiting through the light exit plate surface 19b near the LEDs 17 can be effectively used for display over a wide range, and the frame width of the backlight device 12 can be optimally reduced.

Each of the LEDs 17 includes the effective light emission area EA in a portion of the surface (the light emission surface 17a) opposite the light entrance edge surface 19a of the light guide plate 19 and the bonding member 25. The bonding member 25 is formed such that a thickness thereof is equal to or smaller than a distance between the mounting surface 18a of the LED board 18 and the outline of the effective light emission area EA. Accordingly, among the light rays emitted from the effective light emission area EA of the surface of the LED 17 opposite the light entrance edge surface 19a of the light guide plate 19, light rays directed in the normal direction of the light emission surface 17a are less likely to be directly in contact with the bonding member 25. Accordingly, the light rays emitted by the LEDs 17 are less likely to transmit through the light absorbing bonding layers and the unevenness in brightness is further less likely to be caused.

The bonding member 25 is disposed at least in a range extending from the light entrance edge surface 19a of the light guide plate 19 to a position on the LED board 18 that is on an inner side from the light guide plate 19 side edge of the LED board 18. According to such a configuration, the light rays emitted by the LED 17 and directed toward the portion between the opposite plate surface 19c of the light guide plate 19 and the mounting surface 18a of the LED board 18 are effectively absorbed at least by the light absorbing material contained in the light absorbing bonding layers 27 of the bonding member 25 that is disposed on a same position as the light entrance edge surface 19a of the light guide plate 19 with respect to the arrangement direction in which the LEDs 17 and the light guide plate 19 are arranged. Further, the light rays are less likely to be absorbed excessively by the light absorbing material contained in the light absorbing bonding layers 27 compared to a configuration that the bonding member 25 extends to the light guide plate 19 side edge of the LED board 18 with respect to the arrangement direction in which the LEDs 17 and the light guide plate 19 are arranged. Therefore, the brightness is less likely to be lowered.

The bonding member 25 includes the base member 25a and a pair of bonding layers 25b. The base member 25a is formed of a film that follows the mounting surface 18a of the LED board 18 and the opposite plate surface 19c of the light guide plate 19. The bonding layers 25b are formed on front and rear surfaces of the base member 25a, respectively. At least one of the bonding layers 25b that is bonded to the opposite plate surface 19c of the light guide plate 19 is the light absorbing bonding layer 27. Thus, the bonding member 25 is configured such that the bonding layers 25b formed on the respective front and rear surfaces of the base member 25a are bonded to the mounting surface 18a of the LED board 18 and the opposite plate surface 19c of the light guide plate 19, respectively. Accordingly, the LED board 18 and the light guide plate 19 can be held. At least one of the bonding layers 25b that is bonded to the opposite plate surface 19c of the light guide plate 19 is the light absorbing bonding layer 27. Therefore, the light rays emitted by the LEDs 17 and directed toward a portion between the opposite plate surface 19c of the light guide plate 19 and the base member 25a can be effectively absorbed by the light absorbing material contained in the light absorbing bonding layers 27. Accordingly, unevenness in brightness is less likely to occur.

The bonding member 25 includes the base member 25a and the light absorbing material contained therein. Accordingly, the light rays emitted by the LEDs 17 can be absorbed by the light absorbing material contained in the base member 25a of the bonding member 25 and therefore, unevenness in brightness is further less likely to be caused.

The bonding member 25 includes the boding layers 25b in a pair that are the light absorbing bonding layers 27. Accordingly, the light rays emitted by the LEDs 17 and directed to the portion between the base member 25a and the mounting surface 18a of the LED board 18 can be absorbed by the light absorbing material contained in each of the light absorbing layers 27. Therefore, unevenness in brightness is less likely to be caused.

The frame (a frame member) 16 is provided to surround the LEDs 17 and the light guide plate 19. The bonding member 25 includes a frame bonding portion (a frame portion bonding portion) 28 with which the frame 16 is bonded to the mounting surface 18a of the LED board 18. Thus, the frame 16 is held by the LED board 18 with the frame bonding portion 28. The number of parts is reduced compared to a configuration including another member for bonding the frame 16 to the mounting surface 18a of the LED board 18.

The frame 16 at least includes the frame portion 16a extending along a periphery of the light guide plate 19 and the LED holding portions 16b that are continuous from the frame portion 16a and provided opposite the light entrance edge surface 19a of the light guide plate 19. The LED holding portions 16b hold the respective LEDs 17 therebetween. The frame bonding portion 28 is bonded to the mounting surface 18a of the LED board 18 and at least the LED holding portions 16b of the frame 16. Accordingly, the frame bonding portion 28 is bonded to the LED holding portions 16b that are continuous from the frame portion 16a and provided opposite the light entrance edge surface 19a of the light guide plate 19 and hold the respective LEDs 17 therebetween. Thus, the frame 16 is bonded to the LED board 18. If some of the light rays emitted by the LEDs 17 is directed toward the side of the LEDs 17, the light rays can be absorbed by the light absorbing material contained in the light absorbing layers 27 of the frame bonding portion 28. Therefore, unevenness in brightness is less likely to occur.

The frame bonding portion 28 is bonded to the mounting surface 18a of the LED board 18 and the LED holding portions 16b and the frame portion 16a of the frame 16. Accordingly, a portion of the bonding member 25 that is bonded to the opposite plate surface 19c of the light guide plate 19 is connected to a portion of the frame bonding portion 28 of the bonding member 25 bonded to the frame portion 16a via the portions of the frame bonding portion 28 that are to be bonded to the LED holding portions 16b. Therefore, the bonding member 25 has great strength. Further, the frame 16 and the LED board 18 are held with greater bonding force.

The bonding member 25 extends along the light entrance edge surface 19a of the light guide plate 19 and includes portions overlapping the LEDs 17 and portions not overlapping the LEDs 17 with respect to the extending direction. Therefore, some of the light rays emitted by the LEDs 17 that is directed toward the front side of the LED 17 can be absorbed by portions of the light absorbing bonding layers 27 overlapping the LEDs 17 with respect to the extending direction thereof. Some of the light rays emitted by the LEDs 17 and traveling obliquely with respect to the front side of the LED 17 can be absorbed by the portions of the light absorbing bonding layers 27 not overlapping the LEDs 17 with respect to the extending direction thereof. Accordingly, unevenness in brightness is less likely to be caused.

The liquid crystal display device (the display device) 10 according to the present embodiment includes the backlight device 12 and the liquid crystal panel (the display panel) displaying images with using light rays from the backlight device 12. According to the liquid crystal display device 10 having the above configuration, the unevenness in brightness of exit light from the backlight device 12 is less likely to be caused and the frame width of the backlight device 12 is reduced. Therefore, the display quality of images displayed on the liquid crystal panel 11 is improved and design of the liquid crystal display device 10 is improved.

Second Embodiment

A second embodiment of the present invention will be described with reference to FIG. 10 and FIG. 11. In the second embodiment, a planar shape of a bonding member 125 is altered from that of the first embodiment. Configurations, operations, and effects similar to those of the first embodiment will not be described.

Figure 10:
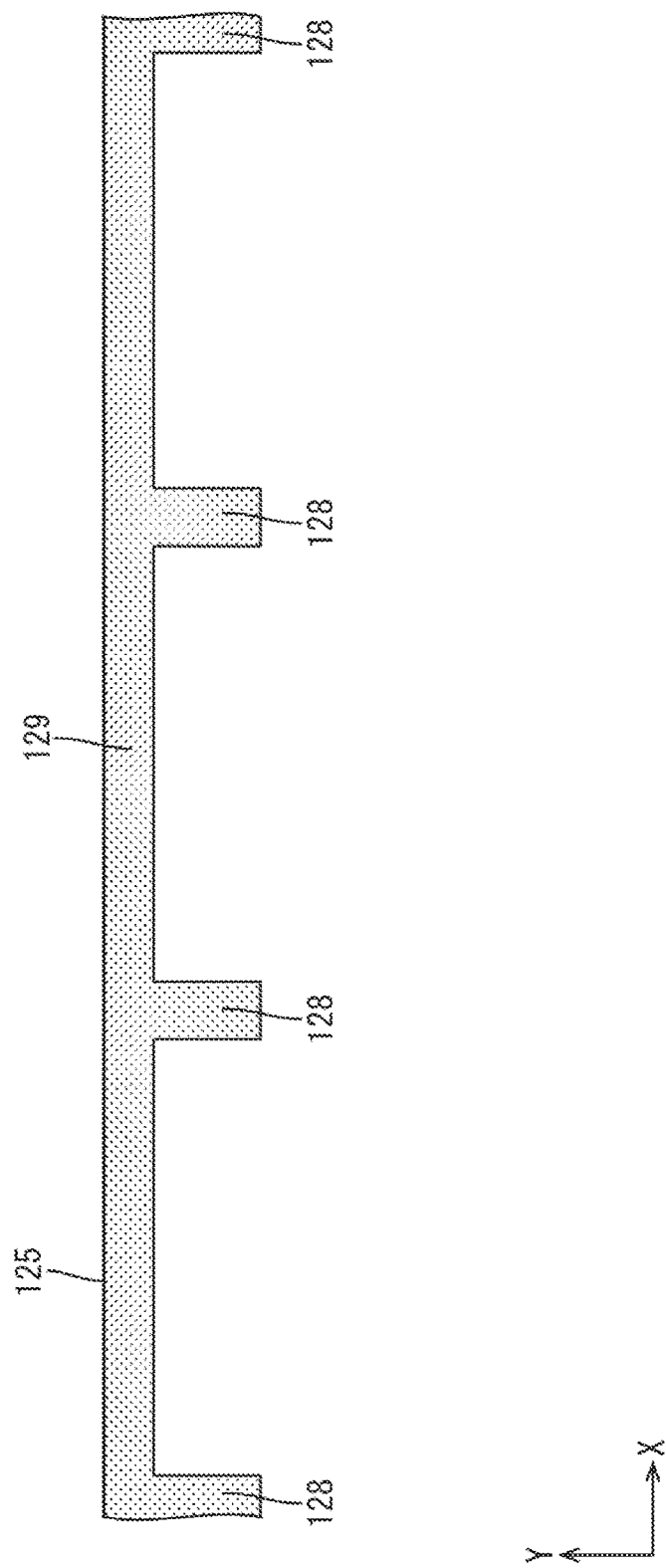
FIG. 10 is a plan view of a bonding member according to a second embodiment of the present invention.
Figure 11:
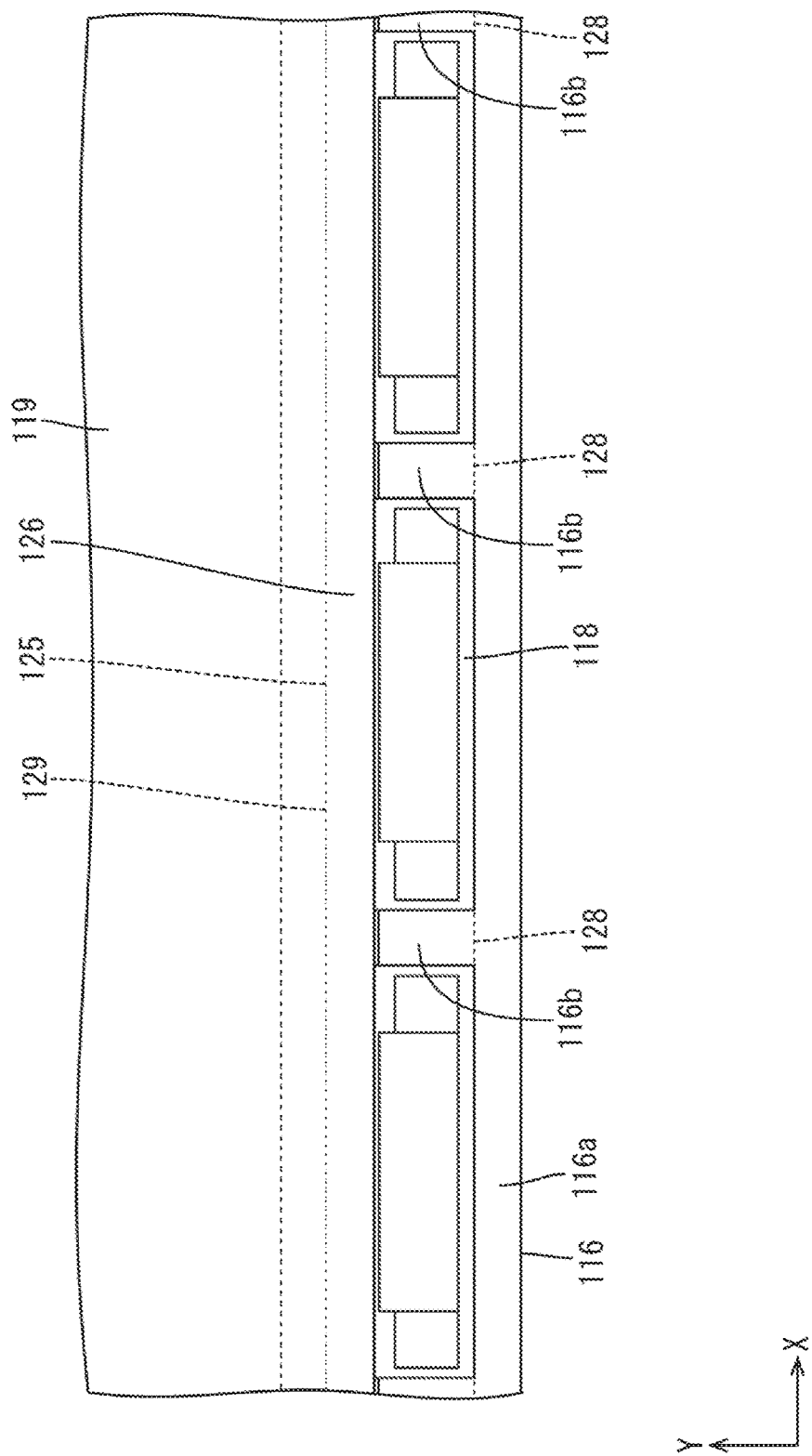
FIG. 11 is a plan view illustrating a part of the backlight device near an LED board.

As illustrated in FIG. 10, the bonding member 125 according to this embodiment has a comb-teeth plan view shape. As illustrated in FIGS. 10 and 11, the bonding member 125 includes a light guide plate bonding portion 129 that is bonded to a light entrance side edge portion 126 of a light guide plate 119 and frame bonding portions 128 that are not bonded to a frame portion 116a of a frame 116 but bonded to LED holding portions 116b. Each of the frame bonding portions 128 is separately provided for each of the LED holding portions 116b and the frame bonding portions 128 are disposed at intervals with respect to the X-axis direction and continuously from the light guide plate bonding portion 129. The frame 116 and a LED board 118 can be held with the above-structured bonding member 125.

Third Embodiment

A third embodiment of the present invention will be described with reference to FIG. 12. In the third embodiment, arrangement of a bonding member 225 is altered from that in the first embodiment. Configurations, operations, and effects similar to those of the first embodiment will not be described.

Figure 12:
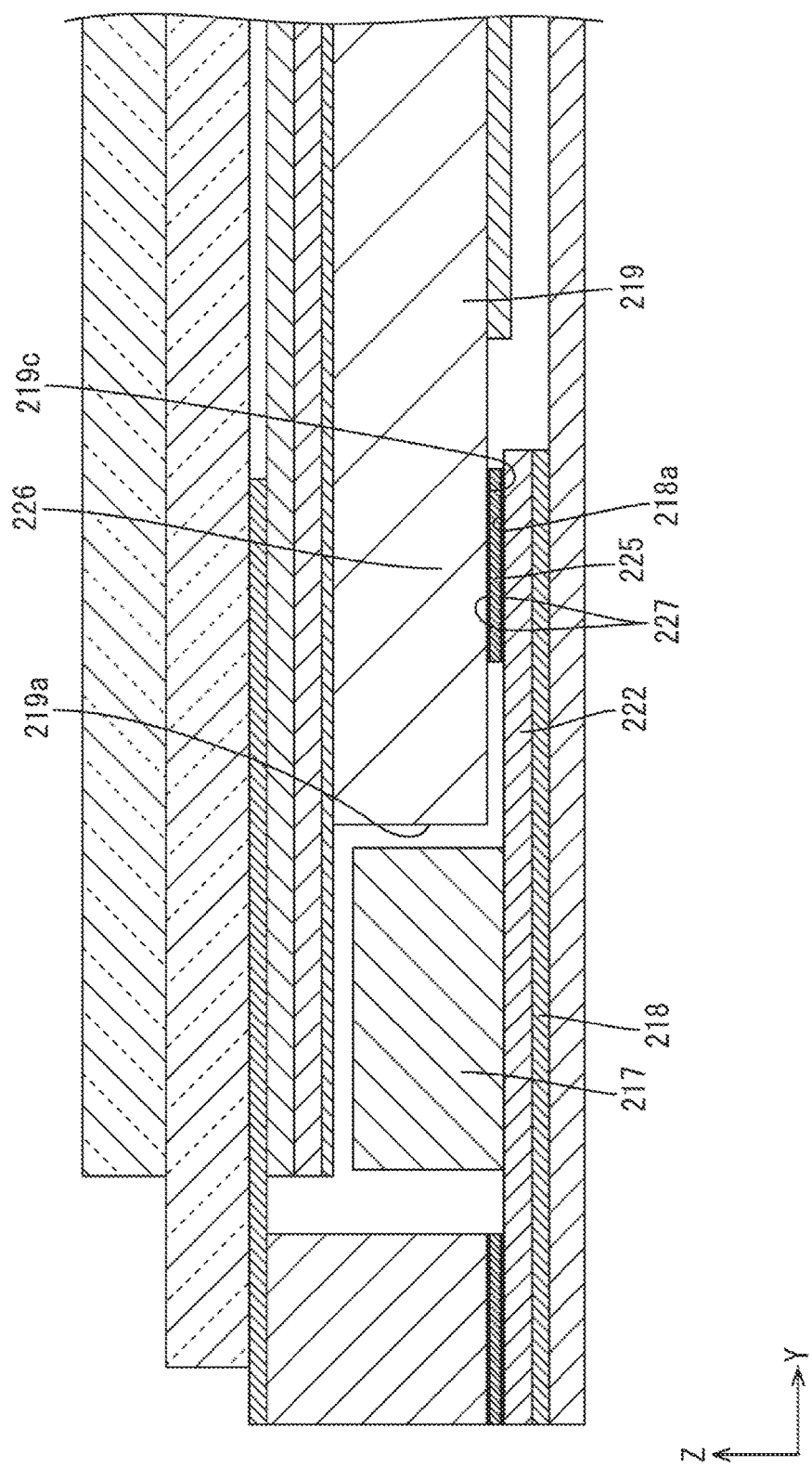
FIG. 12 is a side cross-sectional view illustrating a part of a backlight device near an LED board according to a third embodiment of the present invention.

As illustrated in FIG. 12, the bonding member 225 according to the present embodiment is disposed on a portion of a light guide plate 219 that is closer to an inner side (a middle portion) thereof from a light entrance edge surface 219a of the light guide plate 219 with respect to the Y-axis direction. Namely, the bonding member 225 is bonded to a portion of a light guide plate overlapping portion 222 of a light guide plate 218 farther away from LEDs 217. Even with such a configuration, a gap is less likely to be generated between amounting surface 218a of the light guide plate overlapping portion 222 of the LED board 218 and an opposite plate surface 219c of a light entrance side edge portion 226 of the light guide plate 219 because of the bonding member 225. The light rays leaking through a gap can be absorbed by the light absorbing material contained in light absorbing bonding layers 227.

Fourth Embodiment

A fourth embodiment of the present invention will be described with reference to FIG. 13. In the fourth embodiment, a configuration of a panel bonding member 313 is altered from that of the first embodiment. Configurations, operations, and effects similar to those of the first embodiment will not be described.

Figure 13:
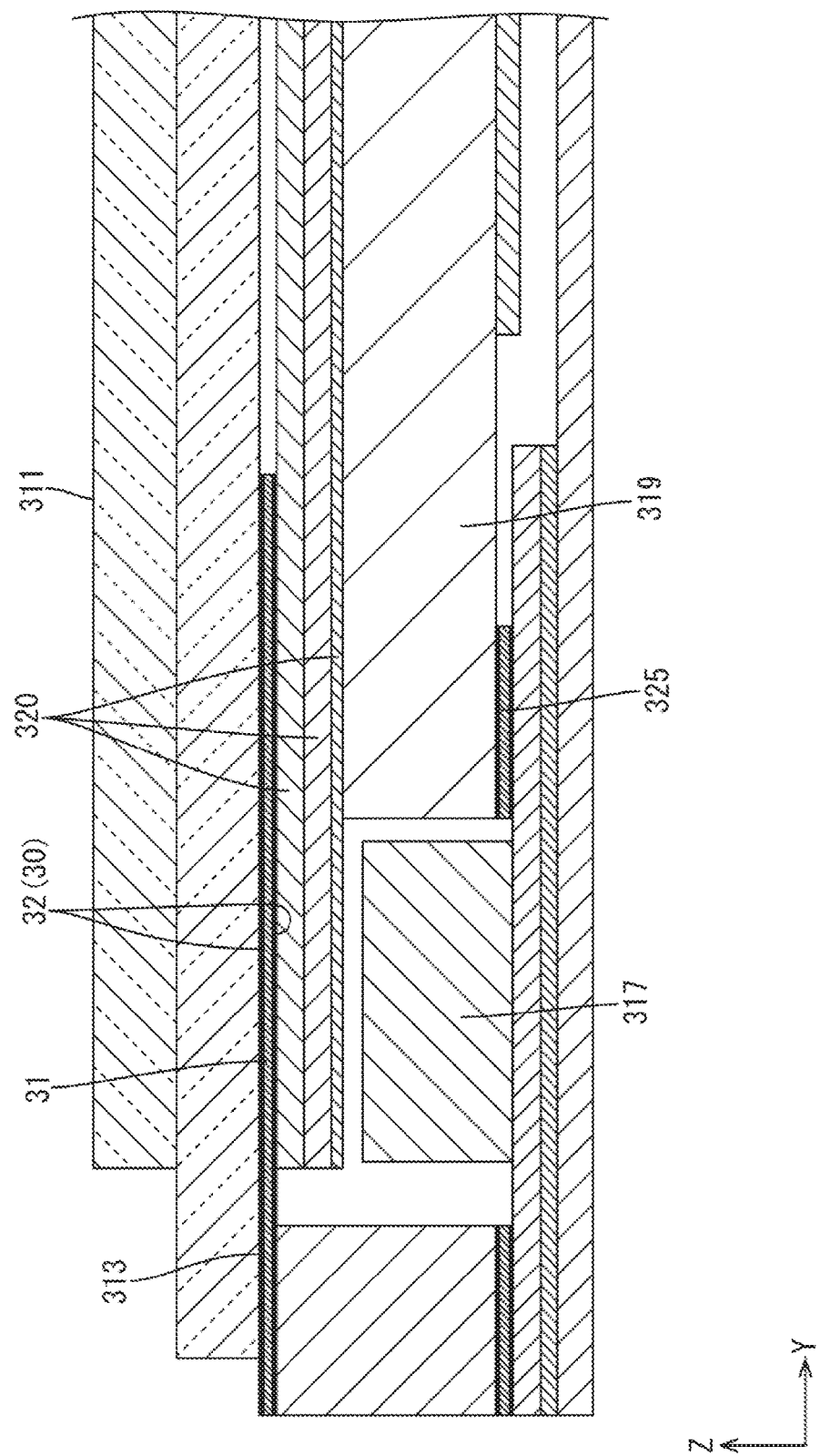
FIG. 13 is a side cross-sectional view illustrating a part of a backlight device near an LED board according to a fourth embodiment of the present invention.

As illustrated in FIG. 13, the panel bonding member 313 includes light absorbing bonding layers 30 each including bonding material and light absorbing material contained therein similar to the bonding member 325. Specifically, the panel bonding member 313 includes a base member 31 that is a film formed to follow plate surfaces of a liquid crystal panel 311 and an optical sheet 320 and bonding layers 32 in a pair formed on front and rear surfaces of the base member 31. The bonding layers 32 are light absorbing bonding layers 30. The base member 31 exhibits black having good light absorbing properties. Namely, the panel bonding member 313 is formed of a same member as the bonding member 325 and differs in a planar shape from that of the bonding member 325. The panel bonding member 313 holds the liquid crystal panel 311 and the optical sheet 320 such that the light rays from the LEDs 317 are less likely to directly transmit through the liquid crystal panel 311 without being through the light guide plate 319 and the display quality of images displayed on the liquid crystal panel 311 is improved.

Fifth Embodiment

A fifth embodiment of the present invention will be described with reference to FIG. 14. In the fifth embodiment, a light absorbing member 33 is additionally included in the configuration of the first embodiment. Configurations, operations, and effects similar to those of the first embodiment will not be described.

Figure 14:
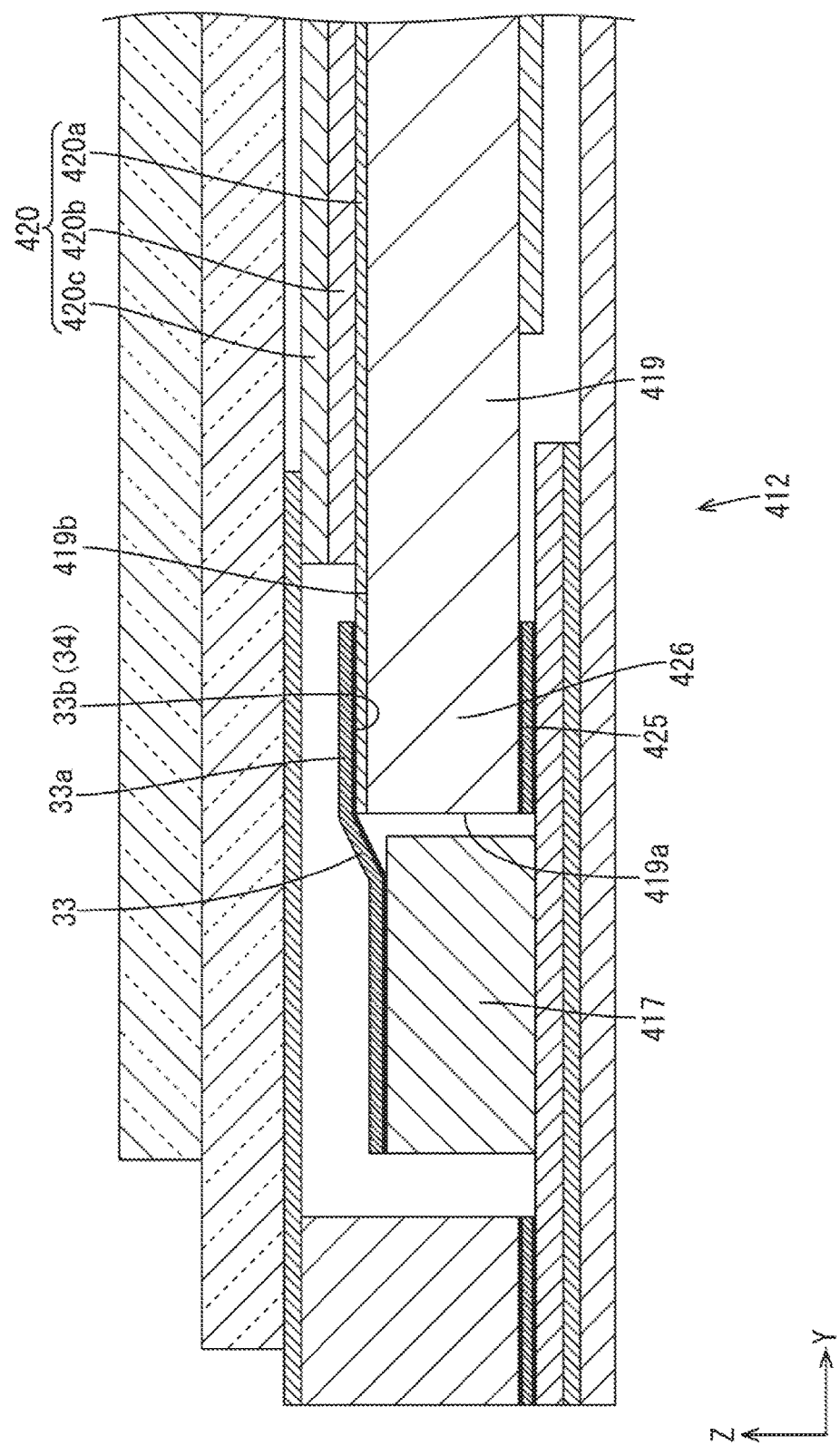
FIG. 14 is a side cross-sectional view illustrating a part of a backlight device near an LED board according to a fifth embodiment of the present invention.

As illustrated in FIG. 14, a backlight device 412 according to the present embodiment includes the light absorbing member 33 containing light absorbing material and provided to overlap a light entrance side edge portion 426 that is a part of the light guide plate 419 on a front side with respect to the light entrance side edge portion 426, that is, on a light exit plate surface 419b side. According to such a configuration, among the light rays emitted by the LEDs 417, light rays travelling in the light guide plate 419 toward a light exit plate surface 419b without passing through a light entrance edge surface 419a can be absorbed light absorbing material contained in the light absorbing member 33. Therefore, unevenness in brightness is less likely to be caused. Specifically, the light absorbing member 33 includes a base member 33a that is a film formed to follow a light exit plate surface 419b of the light guide plate 419 and a plate surface of an optical sheet 420 and a bonding layer 33b formed on a rear surface of the base member 33a. The bonding layer 33b is a light absorbing bonding layer 34 that absorbs the light absorbing material. The base member 33a exhibits black having good light absorbing properties. Namely, the light absorbing member 33 has a substantially same cross-sectional configuration as that of the bonding member 425 except for the front-side bonding layer 425b. The material of the base member 33a and the bonding layer 33b is same as that of the bonding member 425.

The light absorbing member 33 overlaps the light guide plate 419 on the front side via an optical sheet 420. The optical sheet 420 overlapping the light absorbing member 33 is only a diffuser sheet 420a that is disposed closest to the light guide plate 419. Other ones of the optical sheet 420 that are a first prism sheet 420b and a second prism sheet 420c are disposed on an inner side than the diffuser sheet 420a so as not to overlap the light absorbing member 33. Namely, a LED 417 side edge portion (a part) of the diffuser sheet 429a is sandwiched between the light guide plate 419 and the light absorbing member 33 with respect to the Z-axis direction and the bonding layer 33b of the light absorbing member 33 is bonded to a front surface of the LED 417 side edge portion. According to such a configuration, an air layer is between the light exit plate surface 419b of the light guide plate 419 and the diffuser sheet 420a and the light absorbing member 33 is not disposed therebetween. Therefore, light rays entering through the light entrance edge surface 419a and travelling within the light guide plate 419 are less likely to be absorbed by the light absorbing member 33 and such light rays are totally reflected by the light exit plate surface 419b and effectively used. Accordingly, brightness is less likely to be lowered. The light absorbing member 33 extends in the light guide plate 419, the diffuser sheet 420a, and the LEDs 417. Therefore, a space between the LEDs 417 and the light entrance edge surface 419a of the light guide plate 419 is covered with the light absorbing member 33 from the front side. The light absorbing member 33 has a belt-like shape extending in the X-axis direction and having a length dimension that is substantially equal to a short-side dimension of the light guide plate 419. Therefore, a space between adjacent LEDs 417 in the X-axis direction is covered with the light absorbing member 33 from the front side. A width dimension of a portion of the light absorbing member 33 overlapping the light guide plate 419 is substantially equal to a width dimension of the bonding member 425 and edge surfaces of the light absorbing member 33 and the bonding member 425 are on a same plane with respect to the Y-axis direction.

As described before, this embodiment includes the light absorbing member 33 overlapping a part of the light guide plate 419 on the light exit plate surface 419b side and containing the light absorbing material. Accordingly, among the light rays emitted by the LEDs 417, the light rays travel in the light guide plate 419 toward the light exit plate surface 419b without passing through the light entrance edge surface 419a can be absorbed by the light absorbing material contained in the light absorbing member 33. Therefore, unevenness in brightness is less likely to be caused.

The optical sheet (the optical member) 420 is overlapped the light guide plate 419 on the light exit plate surface 419b side, and the light absorbing member 33 is disposed to overlap a part of the optical sheet 420 while the light absorbing member 33 and the light guide plate 419 sandwiching the optical sheet 420. Accordingly, no light absorbing member 33 is between the light exit plate surface 419b of the light guide plate 419 and optical sheet 420 and therefore, the light rays entering through the light entrance edge surface 410a and travelling within the light guide plate 419 are less likely to be absorbed by the light absorbing member 33 and are totally reflected by the light exit plate surface 419b and effectively used. Accordingly, brightness is less likely to be lowered.

Sixth Embodiment

Figure 16:
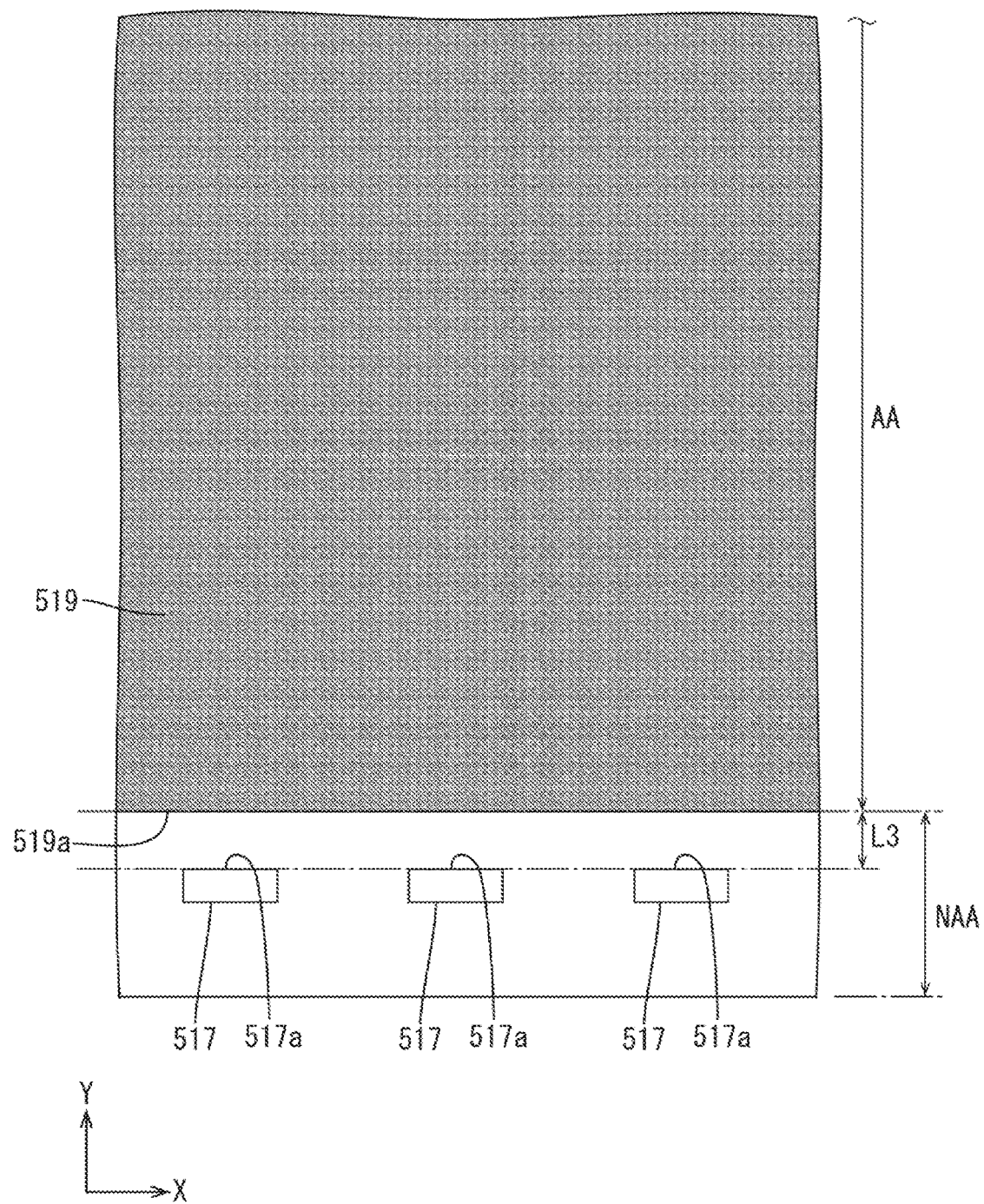
FIG. 16 is a plan view illustrating a brightness distribution within a light exit plate surface of a light guide plate according to Example 2 of Comparative Experiment 2.
Figure 17:
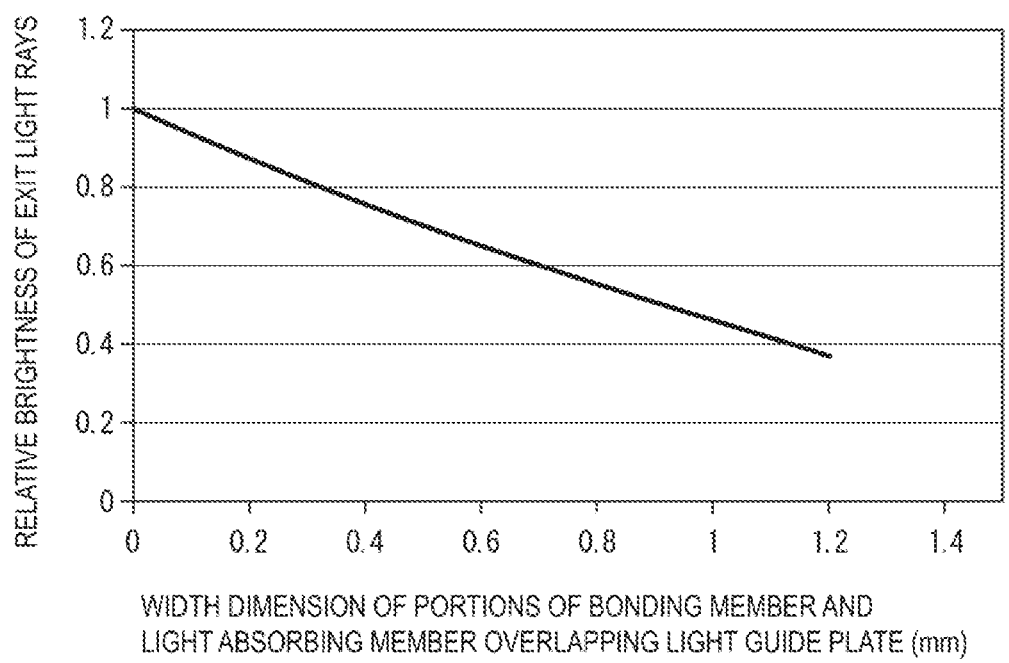
FIG. 17 is a graph representing relation between a width dimension of portions of a bonding member and a light absorbing member overlapping the light guide plate and relative brightness of exit light rays.

A sixth embodiment of the present invention will be described with reference to FIGS. 15 to 17. In the sixth embodiment, a configuration of an optical sheet 520 is altered from that in the fifth embodiment and a component to which a light absorbing member 533 is bonded is altered. Configurations, operations, and effects similar to those of the fifth embodiment will not be described.

Figure 15:
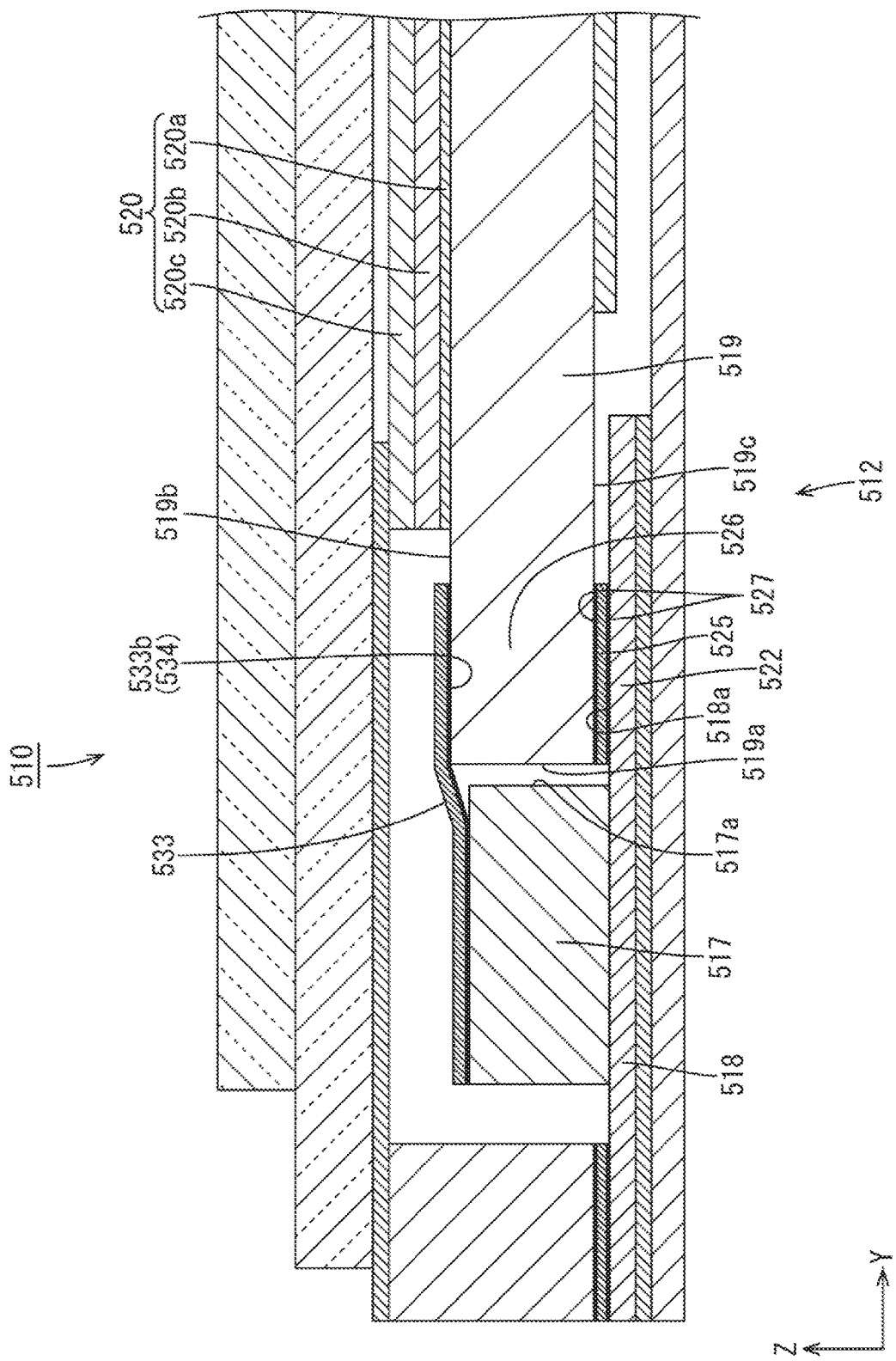
FIG. 15 is a side cross-sectional view illustrating a part of a backlight device near an LED board according to a sixth embodiment of the present invention.

As illustrated in FIG. 15, in the optical sheet 520 according to this embodiment, an edge portion of a diffuser sheet 520a closer to LEDs 517 is disposed on inner side than a light entrance edge surface 519a of a light guide plate 519 and is disposed on a same position as that of a first prism sheet 520b and a second prism sheet 520c. The light absorbing member 533 is disposed to directly overlap a light exit plate surface 519b of a light entrance side edge portion 526 of the light guide plate 519. A bonding layer 533b (a light absorbing bonding layer 534) is directly bonded to the light exit plate surface 519b. According to such a configuration, the light absorbing member 533 is opposite the LED 517 side edge surface of the diffuser sheet 520a and therefore, light rays emitted by the LEDs 517 are less likely to directly enter the diffuser sheet 520a through the LED 517 side edge surface without passing through the light entrance edge surface 519a of the light guide plate 519. Accordingly, unevenness in brightness is less likely to be caused.

To substantiate the operations and effects, following Comparative Experiment 2 was performed. In Comparative Experiment 2, a backlight device 512 including the above-described light absorbing member 533 was prepared in Example 2, and a brightness distribution within a plane surface of a light exit plate surface 519b was measured when LEDs 517 of the backlight device 512 of Example 2 are lighted on. Experiment results of Comparative Experiment 2 are illustrated in FIG. 16. In FIG. 16, similarly to FIGS. 8 and 9 of Comparative Experiment 1, a density of dots is changed according to change of a brightness level that corresponds to an amount of light rays in a unit area of the light exit plate surface 519b. The brightness is lowered as the density of dots is increased, and the brightness is increased as the density of dots is lowered. In FIG. 16, an approach distance L3 that is a distance from light emission surfaces 517a of the LEDs 517 to the outer edge position of the display area AA is illustrated. In FIG. 16, the light absorbing member 533 is not illustrated.

Experiment results of Comparative Experiment 2 will be described. As illustrated in FIG. 16, small difference is between brightness in a portion of the light exit plate surface 519b near the LEDs 517 (near the light entrance side edge portion 526) and brightness in a portion far from the LEDs 517 (a middle portion) and brightness is equalized as a whole. Namely, in Example 2, evenness in brightness is further improved from that of Example 2 of Comparative Experiment 1. Accordingly, in the backlight device 512 according to Example 2, the light exit plate surface 519b near the light entrance side edge portion 526 includes an area where the light rays exit therethrough cannot be used for display and the area is smaller than that in Example 1 of Comparative Experiment 1 and the approach distance L3 can be smaller than the approach distance L2 of Example 1. In Example 2, the approach distance L3 is smaller than that of Example 1 and therefore, the display area AA is increased and the non-display area NAA is decreased. The backlight device 512 according to Example 2 includes the bonding member 525 that is bonded to the mounting surface 518a of the light guide plate overlapping portion 522 of the LED board 518 and the opposite plate surface 519c of the light entrance side edge portion 526 of the light guide plate 519. The backlight device 512 according to Example 2 further includes the light absorbing member 533 that overlaps the light exit plate surface 519b of the light entrance side edge portion 526 of the light guide plate 519 and that is bonded to the light exit plate surface 519b. Therefore, a gap is less likely to be produced between the opposite plate surface 519c of the light entrance side edge portion 526 and the mounting surface 518a of the light guide plate overlapping portion 522 and a gap is less likely to be produced between the light exit plate surface 519b of the light entrance side edge portion 526 and the light absorbing member 533. Further, the light rays emitted by the LEDs 517 are absorbed by the light absorbing material contained in the light absorbing bonding layers 527 of the bonding member 525 and the light absorbing bonding layer 534 of the light absorbing member 533. Accordingly, a bright portion is less likely to be locally produced in the portion of the light guide plate 519 near the LEDs 517 and unevenness in brightness is less likely to occur. Thus, the display area AA is increased and the non-display area NAA is decreased and a frame width of the backlight device 512 and the liquid crystal display device 510 can be decreased.

The backlight device 512 according to this embodiment includes the light absorbing member 533 in addition to the bonding member 525. Therefore, the amount of absorbed light rays tends to be greater compared to that in the first embodiment and accordingly, brightness may be lowered. Following Comparative Experiment 3 was performed to obtain information how brightness changes according to change in the dimension of the bonding member 525 and the light absorbing member 533 with respect to the Y-axis dimension (in the arrangement direction of the LEDs 517 and the light guide plate 519) or a width dimension of the bonding member 525 and the light absorbing member 533. In Comparative Experiment 3, in the backlight device 512 according to the present embodiment, a width dimension of each of a portion of the bonding member 525 overlapping the light guide plate 519 and a portion of the light absorbing member 533 overlapping the light guide plate 519 is changed within a range from 0 mm to 1.2 mm. Brightness of light rays exiting through the light exit plate surface 519b was measured in the backlight device 512 having the above width dimension of each value within the range. The measurement results are illustrated in FIG. 17. In FIG. 17, a lateral axis represents width dimensions of the portion of the bonding member 525 and the portion of the light absorbing member 533 overlapping the light guide plate 519. A vertical axis represents relative brightness that is relative values of brightness while the brightness value when the width dimension of the portion of the bonding member 525 and the portion of the light absorbing member 533 overlapping the light guide plate 519 is 0 mm or no bonding member 525 or light absorbing member 533 is disposed is regarded as a reference value (1.0)

The experiment results of Comparative Experiment 3 will be described. According to FIG. 17, the relative brightness of the exit light rays is proportionally lowered as the width dimension of the portion of the bonding member 525 and the portion of the light absorbing member 533 overlapping the light guide plate 519 is increased. Especially, if the width dimension of the portion of the bonding member 525 and the portion of the light absorbing member 533 overlapping the light guide plate 519 is greater than 1 mm, the relative brightness of the exit light rays is lower than 0.46 and a user can notably recognize lowering of brightness. The lowering of brightness may occur because the amount of light rays absorbed by the light absorbing material contained in each of the light absorbing bonding layers 527, 534 of the bonding member 525 and the light absorbing member 533, respectively, is too much. The relative brightness is 0.6 and 0.7, respectively, when the width dimension of the portion of the bonding member 525 and the portion of the light absorbing member 533 overlapping the light guide plate 519 is 0.7 mm and 0.5 mm. If the width dimension of the portion of the bonding member 525 and the portion of the light absorbing member 533 overlapping the light guide plate 519 is lower than 0.3 mm, the relative brightness is higher than 0.8. However, manufacturing and mounting of the bonding member 525 and the light absorbing member 533 may be difficult due to problems in processing precision. Therefore, the width dimension of the portion of the bonding member 525 and the portion of the light absorbing member 533 overlapping the light guide plate 519 is set within the range from 0.3 mm to 1 mm such that the brightness is less likely to be lowered and the manufacturing and the mounting will be easy. Therefore, according to this embodiment, the width dimension of the portion of the bonding member 525 and the portion of the light absorbing member 533 overlapping the light guide plate 519 is set within the range from 0.3 mm to 1 mm, and preferably approximately 0.5 mm.

As described before, according to this embodiment, the dimension of the portion of the bonding member 525 and the portion of the light absorbing member overlapping the light guide plate 519 with respect to an arrangement direction in which the LEDs 517 and the light guide plat 519 are arranged is set within the range from 0.3 mm to 1 mm. If the dimension of the portion of the bonding member 525 and the portion of the light absorbing member 533 overlapping the light guide plate 519 with respect to the arrangement direction in which the LEDs 517 and the light guide plat 519 are arranged is greater than 1 mm, the lowering of brightness is notable because the amount of light rays absorbed by the light absorbing material contained in the light absorbing bonding layers 527 is too much. If the dimension of the portion of the bonding member 525 and the portion of the light absorbing member 533 overlapping the light guide plate 519 with respect to the arrangement direction in which the LEDs 517 and the light guide plat 519 are arranged is lower than 0.3 mm, manufacturing and mounting of the bonding member 525 may be difficult due to problems in processing precision. The dimension of the portion of the bonding member 525 and the portion of the light absorbing member 533 overlapping the light guide plate 519 with respect to an arrangement direction in which the LEDs 517 and the light guide plat 519 are arranged is set within the range from 0.3 mm to 1 mm such that the brightness is less likely to be lowered and the manufacturing and the mounting will be easy.

Seventh Embodiment

A seventh embodiment of the present invention will be described with reference to FIG. 18. In the seventh embodiment, a configuration of an optical sheet 620 is altered from that in the sixth embodiment and a component to which a light absorbing member 633 is bonded is altered. Configurations, operations, and effects similar to those of the sixth embodiment will not be described.

Figure 18:
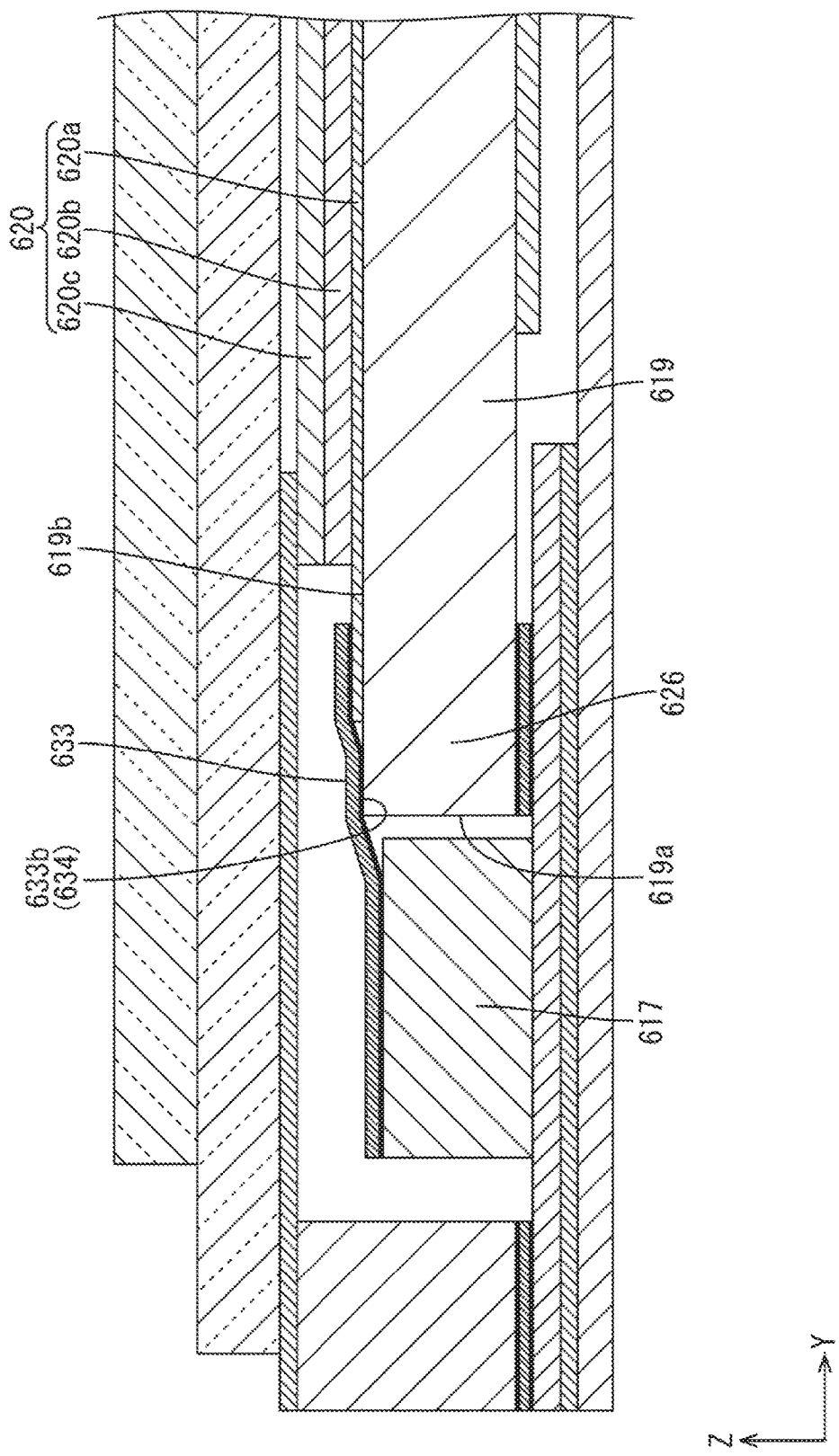
FIG. 18 is a side cross-sectional view illustrating a part of a backlight device near an LED board according to a seventh embodiment of the present invention.

As illustrated in FIG. 18, an optical sheet 620 of this embodiment including a diffuser sheet 620a, a first prism sheet 620b, and a second prism sheet 620c is disposed such that a LED 617 side edge surface of the diffuser sheet 620a is between a light entrance edge surface 619a of the light guide plate 619 and LED 617 side edge surfaces of the first prism sheet 620b and the second prism sheet 620c. Therefore, in a light entrance side edge portion 626 of the light guide plate 619, a part of the light exit plate surface 619b is covered with the diffuser sheet 620a and a rest of the light exit plate surface 619b (closer to the LEDs 617) does not overlap the diffuser sheet 620a. The light absorbing member 633 overlaps the portion of the light exit plate surface 619b of the light entrance side edge portion 626 of the light guide plate 619 not overlapping the diffuser sheet 620a, and the LED 617 side edge portion of the diffuser sheet 620a. Namely, the light absorbing member 633 extends over the light guide plate 619 and the diffuser sheet 620a, and a bonding layer 633b (a light absorbing bonding layer 634) of the light absorbing member 633 is bonded to each of the light guide plate 619 and the diffuser sheet 620a. According to such a configuration, the light absorbing member 633 is disposed opposite the LED 617 side edge surface of the diffuser sheet 620a. Therefore, light rays emitted by the LEDs 617 are less likely to directly enter the diffuser sheet 620a through the LED 617 side edge surface without passing through the light entrance edge surface 619a of the light guide plate 619. Thus, unevenness in brightness is less likely to be caused. Further, an air layer is between a part of the light exit plate surface 619b of the light guide plate 619 and the diffuser sheet 620a and no light absorbing member 633 is therebetween. Therefore, the light rays entering through the light entrance edge surface 619a and travelling within the light guide plate 619 are less likely to be absorbed by the light absorbing member 633 and such light rays are totally reflected by the light exit plate surface 619b and effectively used. Thus, brightness is less likely to be lowered.

Eighth Embodiment

An eighth embodiment of the present invention will be described with reference to FIGS. 19 to 22. In the eighth embodiment, an outline shape of a backlight device 712 is altered from the first embodiment. Configurations, operations, and effects similar to those of the first embodiment will not be described.

Figure 19:
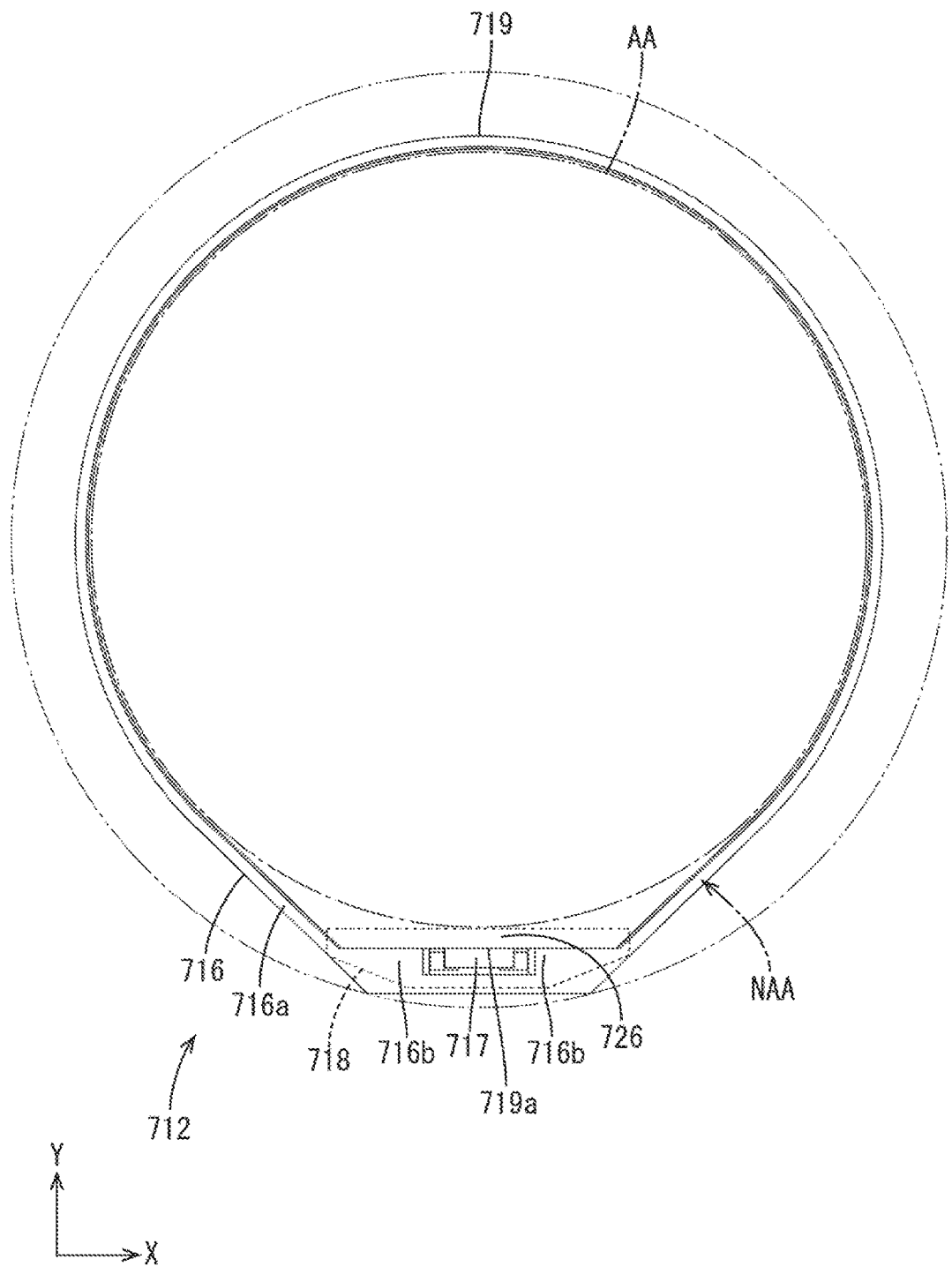
FIG. 19 is a plan view of a backlight device according to an eighth embodiment of the present invention.
Figure 20:
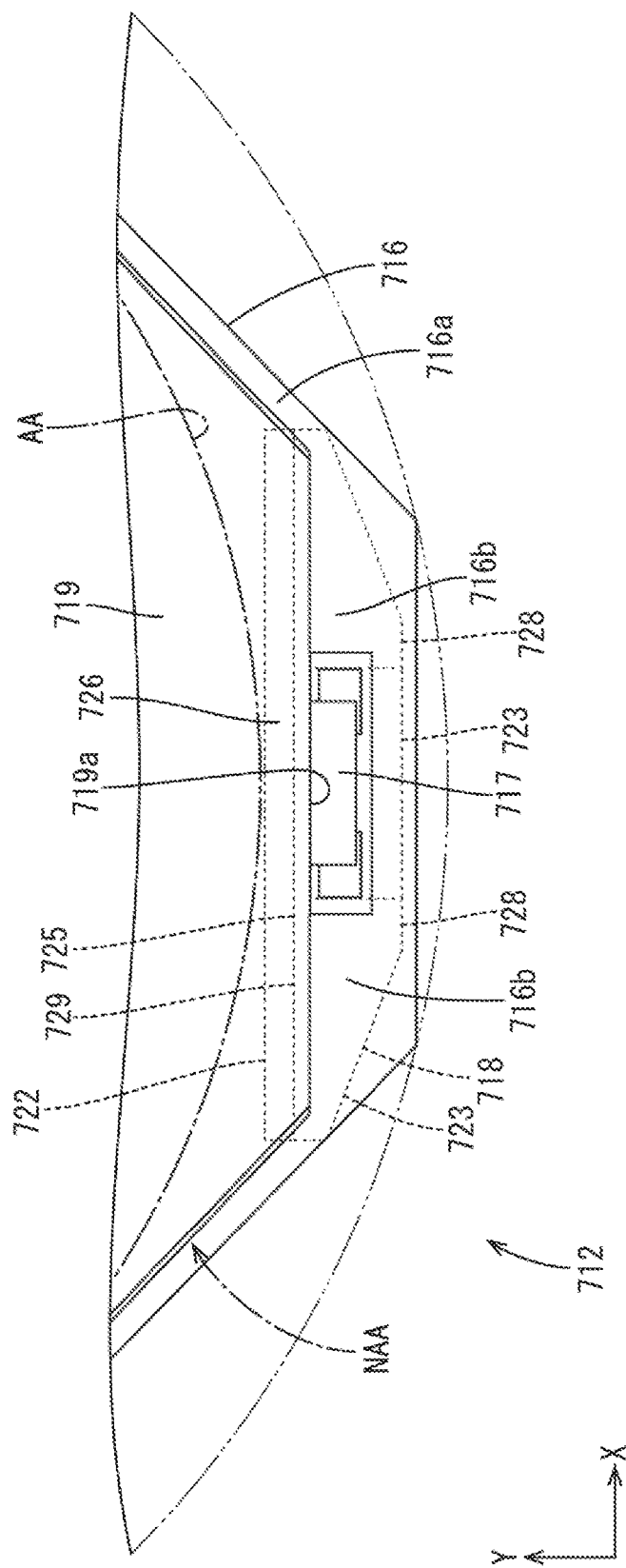
FIG. 20 is a plan view illustrating a part of the backlight device near the LED board.
Figure 21:
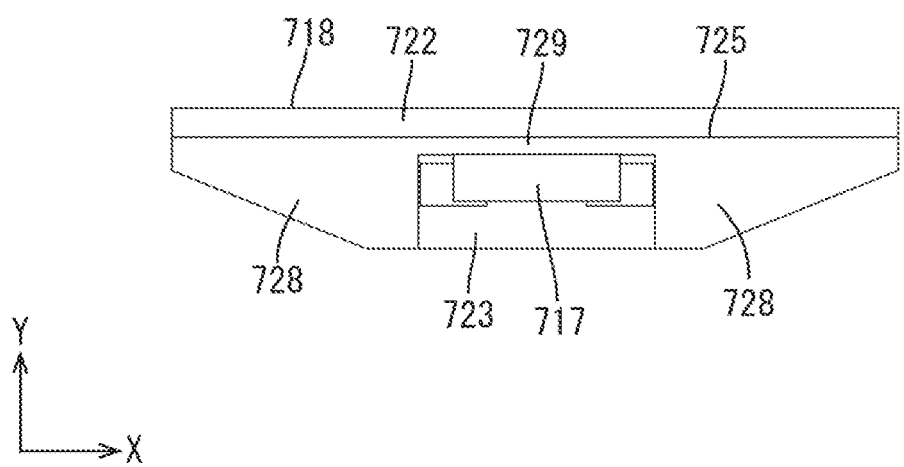
FIG. 21 is a plan view of the LED board and a bonding member.

As illustrated in FIG. 19, the backlight device 712 of this embodiment has a substantially circular plan view outline as a whole (refer a two-dot chain line in FIG. 19). Accordingly, the components included in the backlight device 712 are altered to have an arched outline shape. Most of an outline of a light guide plate 719 has an arched shape and a LED 717 side portion of the light guide plate 719 has a straight outline. A linear portion among peripheral edge surfaces of the light guide plate 719 is a light entrance edge surface 719a. One LED 717 is arranged opposite the light entrance edge surface 719a. As illustrated in FIGS. 20 and 21, an LED board 718 on which the LED 717 is mounted has a laterally elongated plan view shape. The LED board 718 extends in an extending direction (the X-axis direction) in which the light entrance edge surface 719a extends and the LED 717 is mounted on a middle portion thereof. The LED board 718 includes a belt-shaped portion on an inner side than the LED 717 as a light guide plate overlapping portion 722 that overlaps the light guide plate 719. A rest of the LED board 718 (except for the portion where the LED 717 is mounted) is a frame overlapping portion 723 that overlaps an LED holding portion 716b of a frame 716. Two corner portions of the frame overlapping portion 723 that are on an opposite side from the light guide plate 719 are obliquely cut away.

Figure 22:
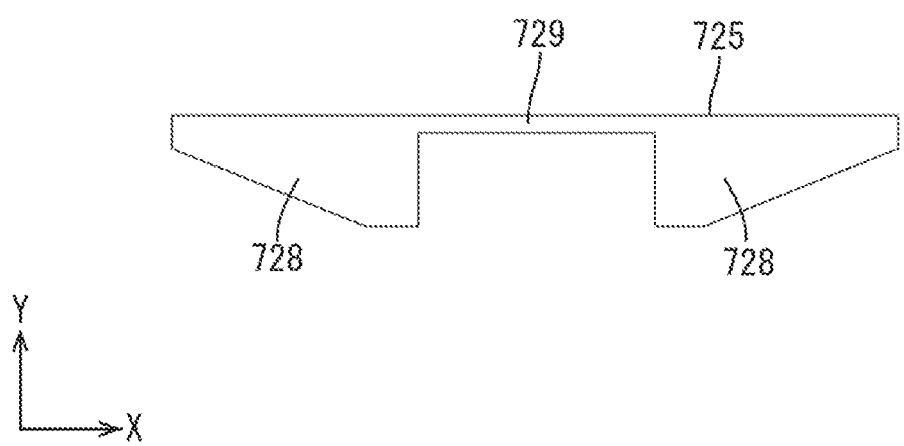
FIG. 22 is a plan view of the bonding member.

As illustrated in FIG. 19, the frame 716 includes a frame portion 716a having a plan view shape following a peripheral edge surface of the light guide plate 719. As illustrated in FIG. 20, a pair of LED holding portions 716b of the frame 716 is disposed opposite the light entrance edge surface 719a of the light guide plate 719 and sandwiches the LED 717 from two sides thereof with respect to the X-axis direction. As illustrated in FIGS. 20 to 22, the bonding member 725 overlaps most portion of the LED board 718 and a part of each of the light guide plate 719 and the frame 716. Specifically, the bonding member 725 includes a light guide plate bonding portion 729 bonded to the light entrance side edge portion 726 of the light guide plate 719 and the light guide plate overlapping portion 722 of the LED board 718. The light guide plate bonding portion 719 has a belt-like shape extending straight in the X-axis direction (the extending direction of the light entrance edge surface 719a). The bonding member 715 includes frame bonding portions 728 bonded to the pair of LED holding portions 716b of the frame 716 and the frame overlapping portion 723 of the LED board 718. The frame bonding portion 728 has a substantially triangular plan view shape and a pair of frame bonding portions 728 sandwich the LED 717 therebetween with respect to the X-axis direction. In FIGS. 19 and 20, a circular dot-and-dash line represents a border of the display area AA and the non-display area NAA.

Ninth Embodiment

A ninth embodiment of the present invention will be described with reference to FIGS. 23 to 26. In the ninth embodiment, the number of LEDs 817 is altered from that in the eighth embodiment. Configurations, operations, and effects similar to those of the eighth embodiment will not be described.

Figure 23:
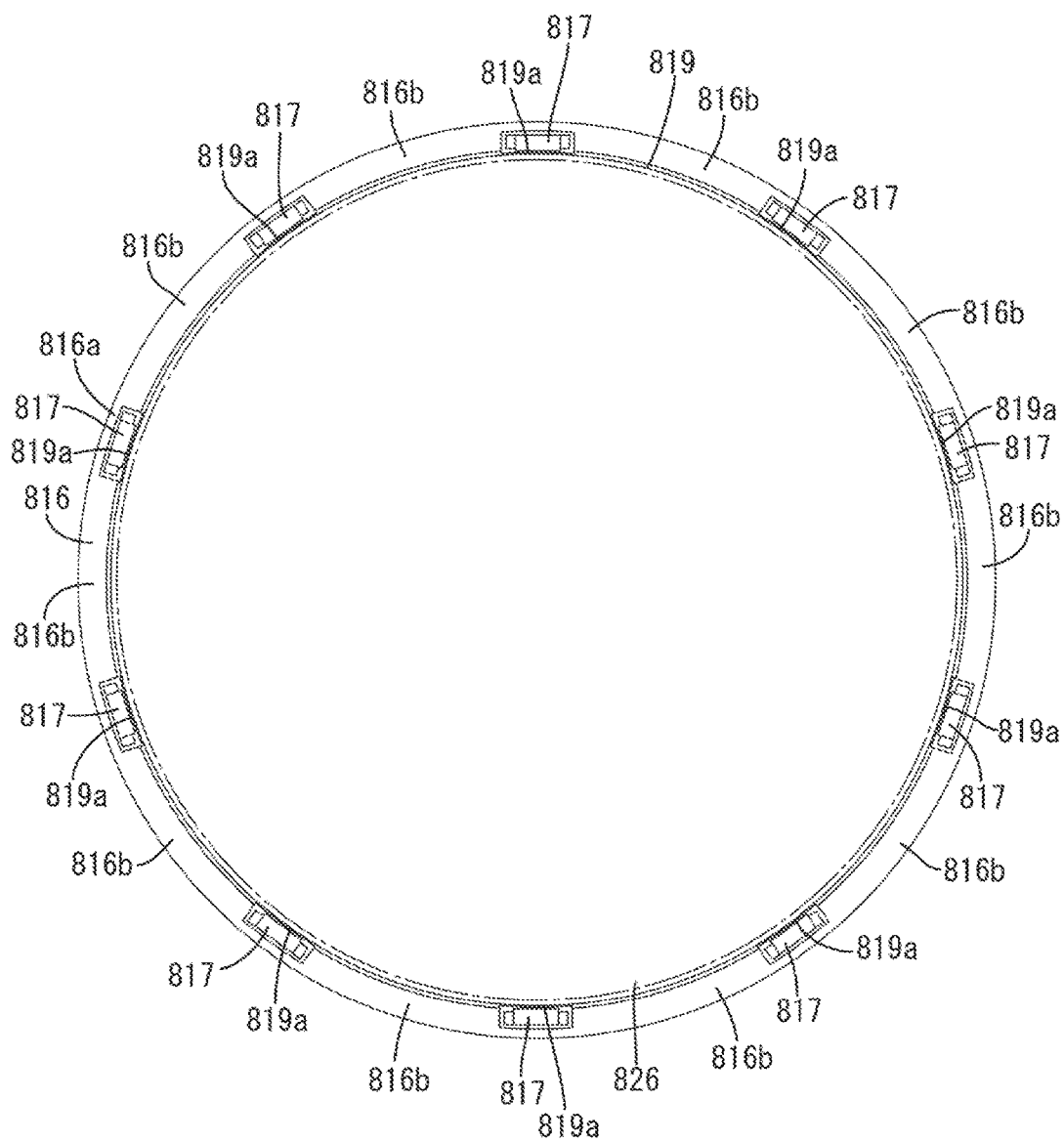
FIG. 23 is a plan view of a backlight device according to a ninth embodiment of the present invention.
Figure 24:
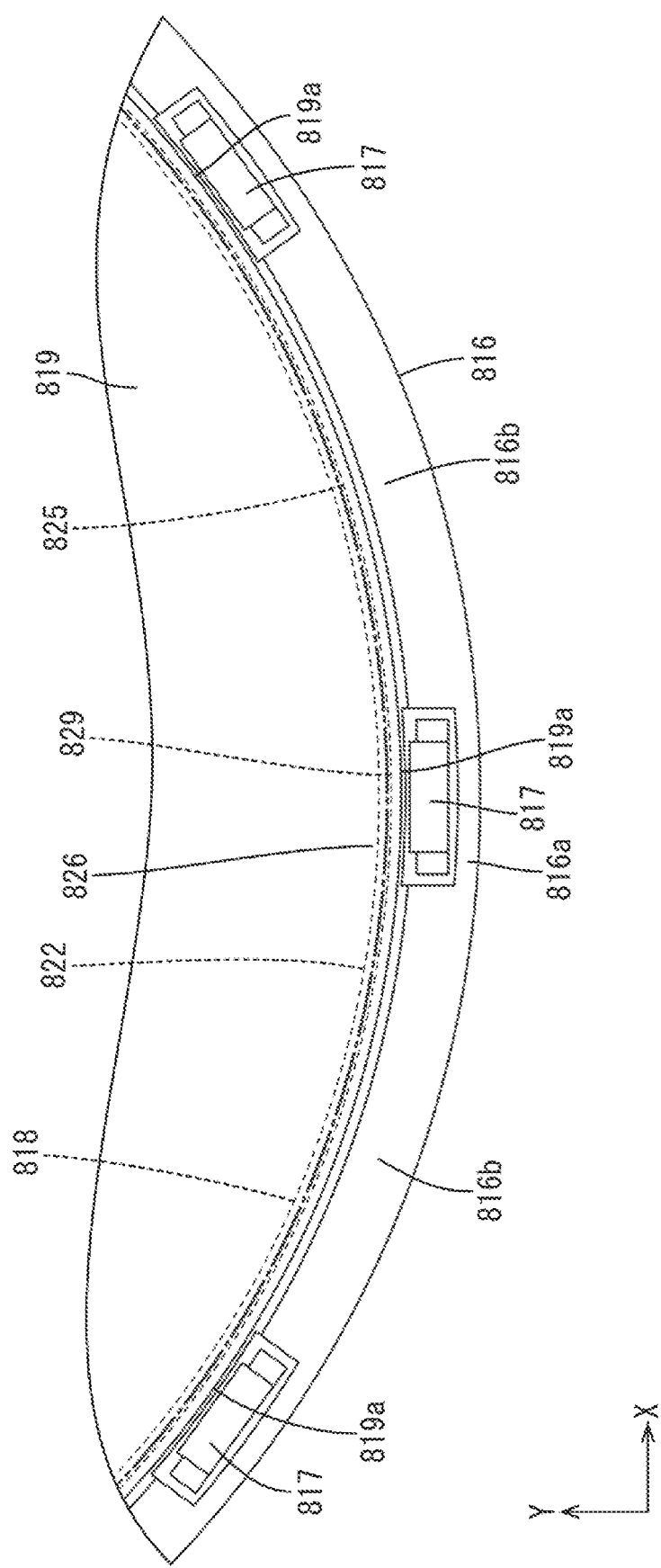
FIG. 24 is a plan view illustrating a part of the backlight device near LEDs.
Figure 25:
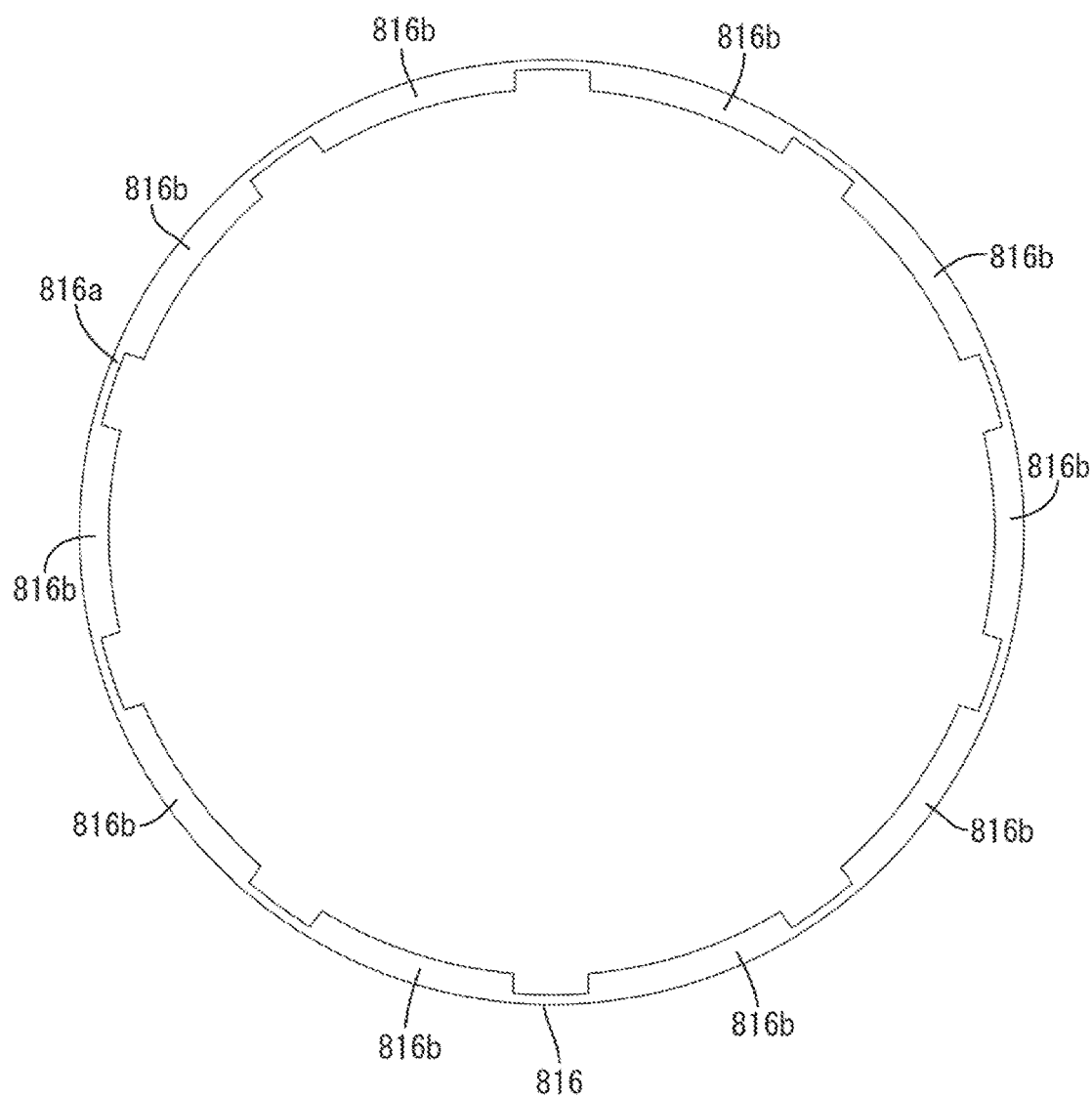
FIG. 25 is a plan view of a frame.

As illustrated in FIG. 23, a light guide plate 819 of this embodiment has a circular plan view shape and an arched peripheral edge surface over entire periphery thereof. The LEDs 817 (ten LEDs in FIG. 23) are arranged at intervals in a circumferential direction of the light guide plate 819. The light guide plate 819 has a light entrance edge surface 819a on a portion of the peripheral edge surface of the light guide plate 819 opposite each of the LEDs 817. The light guide plate 819 has light entrance edge surfaces 819a disposed at intervals in a circumferential direction of the light guide plate 819 similarly to the LEDs 817. As illustrated in FIG. 24, the LED board 818 on which the LEDs 817 are mounted has an arched shape or an endless loop (a donut shape) extending in a circumferential direction over an entire periphery of the light guide plate 819. As illustrated in FIG. 25, a frame 816 has a plan view shape such that the frame portion 816a follows a peripheral edge surface of the light guide plate 819. Namely, the frame 816 has an endless ring shape (an arched shape). Each of the LED holding portions 816b of the frame 816 is disposed between the adjacent LEDs 817 with respect to the circumferential direction of the light guide plate 819 to sandwich each LED 817 from two sides with respect to the circumferential direction of the light guide plate 819. The number of the LED holding portions 816b is same as that of the LEDs 817. Each LED holding portion 816b has a substantially fan shape in a plan view.

Figure 26:
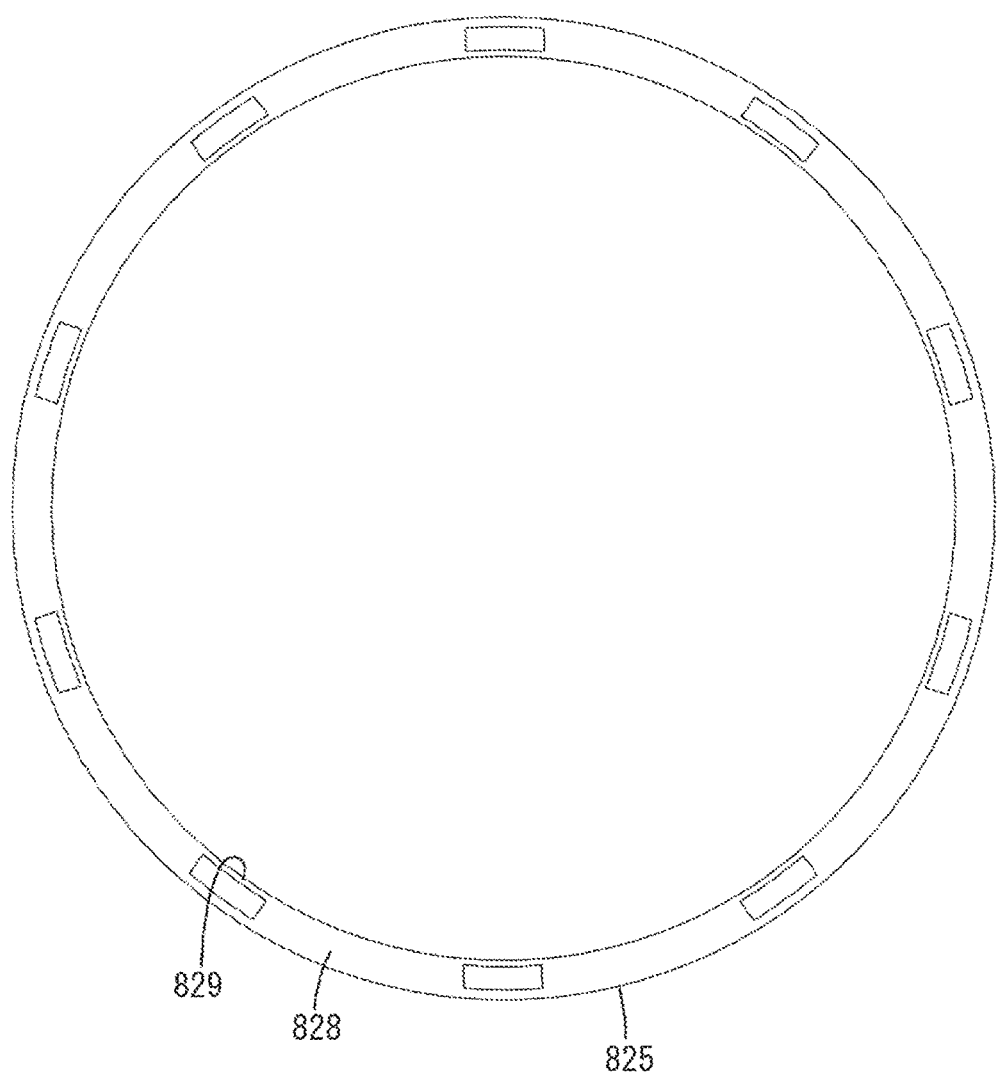
FIG. 26 is a plan view of a bonding member.

As illustrated in FIG. 26, the bonding member 825 overlaps most part of the LED board 818 (except for the portions where the LEDs 817 are mounted) and overlaps substantially an entire area of the light entrance side edge portion 826 of the light guide plate 819 and the frame 816. Specifically, the bonding member 825 includes a light guide plate bonding portion 829 bonded to the light entrance side edge portion 826 of the light guide plate 819 and the light guide plate overlapping portion 822 of the LED board 818. The light guide plate bonding portion 829 has an arched shape extending along an entire periphery of the light guide plate 819 or an endless ring shape. The bonding member 825 includes a frame bonding portion 828 bonded to the frame portion 816a and the LED holding portions 816b of the frame 816 and a frame overlapping portion of the LED board 818. The frame bonding portion 828 has a plan view shape substantially same as that if the frame 816.

Tenth Embodiment

A tenth embodiment of the present invention will be described with reference to FIG. 27. In the tenth embodiment, a bonding member 925 has a plan view shape different from that in the ninth embodiment. Configurations, operations, and effects similar to those of the ninth embodiment will not be described.

Figure 27:
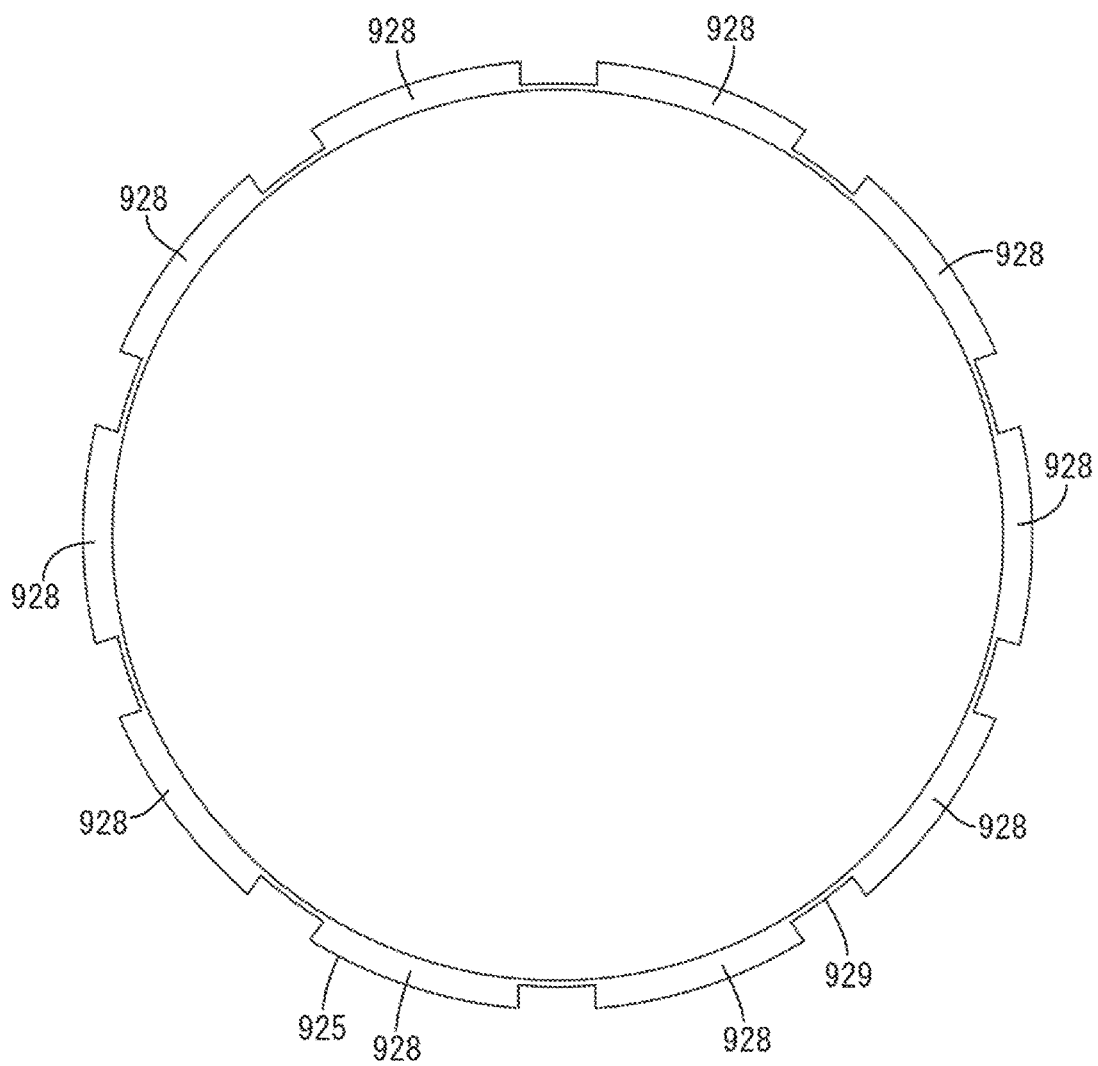
FIG. 27 is a plan view of a bonding member according to a tenth embodiment of the present invention.

As illustrated in FIG. 27, the bonding member 925 according to the present embodiment includes frame bonding portions 928 that do not overlap a frame portion of a frame (not illustrated) but overlap only LED holding portions. The frame bonding portions 928 are disposed at intervals along a periphery of the light guide plate according to a planar arrangement of the LED holding portions. Each of the frame bonding portions 928 has a substantially fan shape in a plan view following an outline of each LED holding portion. Each of the frame bonding portions 928 is connected to a light guide plate boding portion 929 having a ring shape.

Eleventh Embodiment

An eleventh embodiment of the present invention will be described with reference to FIGS. 28 and 29. In the eleventh embodiment, a bonding member 1025 has a plan view shape different from that in the ninth embodiment. Configurations, operations, and effects similar to those of the ninth embodiment will not be described.

Figure 28:
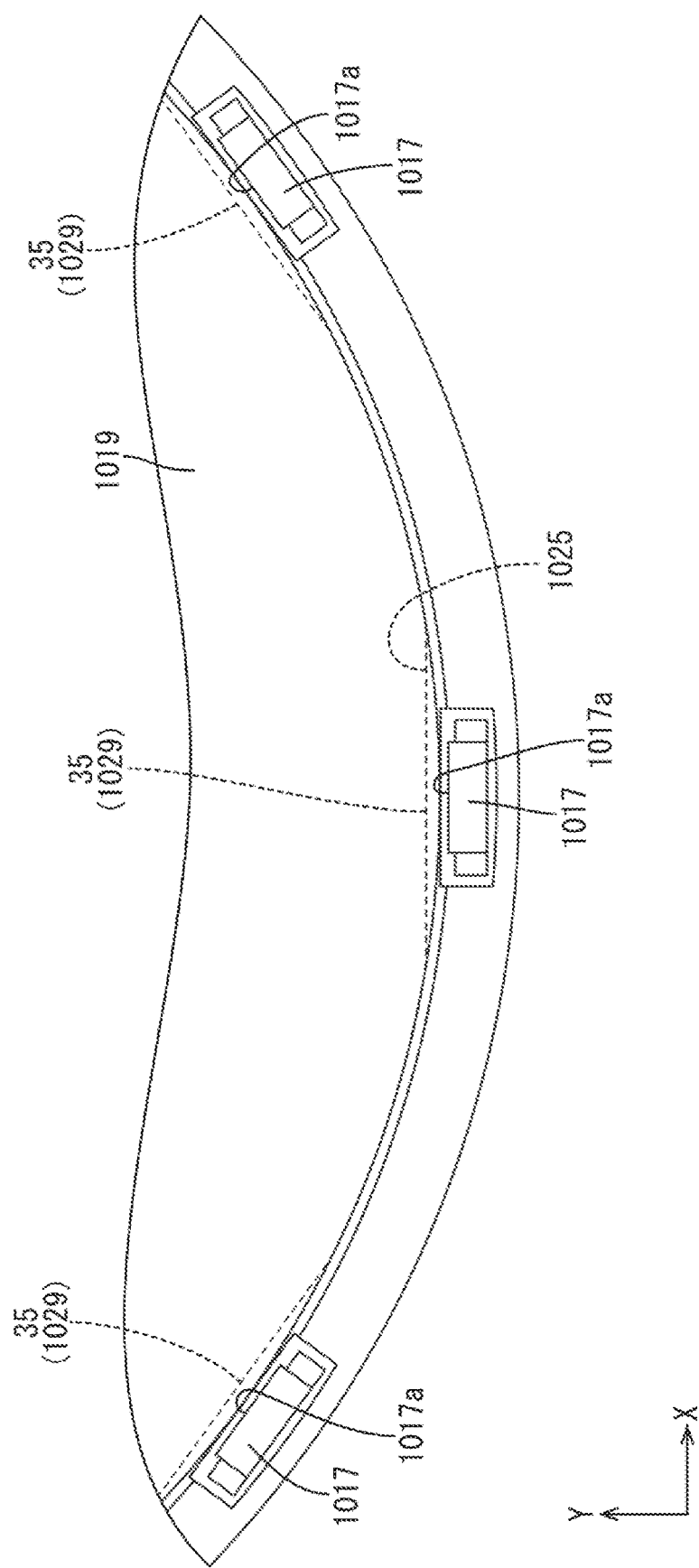
FIG. 28 is a plan view illustrating a part of a backlight device near LEDs according to an eleventh embodiment of the present invention.
Figure 29:
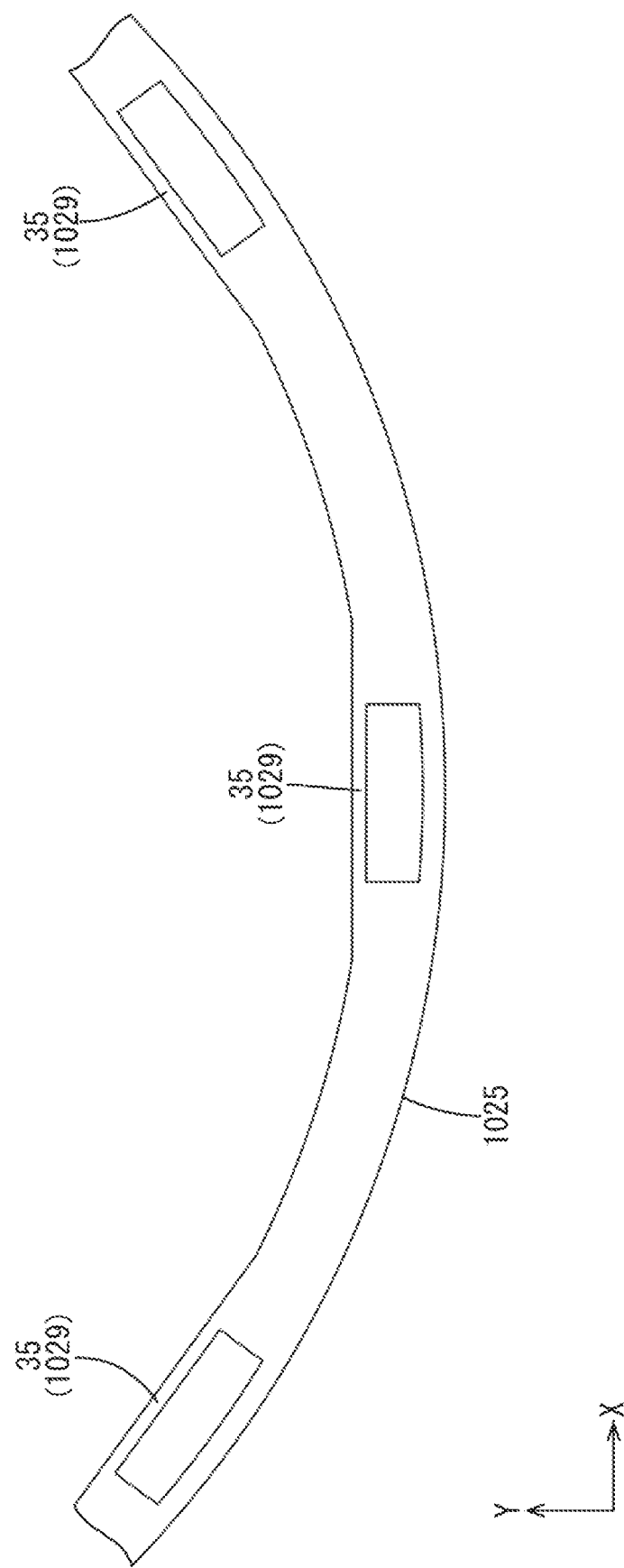
FIG. 29 is a plan view of a bonding member.

As illustrated in FIGS. 28 and 29, the bonding member 1025 according to this embodiment includes linear portions 35 extending straightly such that a light guide plate overlapping portion 1029 crosses a circumferential direction of a light guide plate 1019. Specifically, the linear portions 35 are disposed to overlap each LED 1017 with respect to the circumferential direction of the light guide plate 1019 and the linear portions 35 are disposed at intervals in the circumferential direction of the light guide plate 1019 according to a planar arrangement of the LEDs 1017. The linear portion 35 extends in a direction parallel to an extending direction in which a light emission surface 1017a of each LED 1017 extends and a normal line direction of each light entrance edge surface 1019a of the light guide plate 1019. Each of the linear portions 35 has a portion overlapping the light guide plate 1019 having an arched peripheral edge surface (a light guide plate overlapping portion 1029) and the portion has an arched plan view shape. The light guide plate overlapping portion 1029 of each linear portion 35 has an overlap area where the light guide plate 1019 and the linear portion 35 are overlapped, and the overlap area is reduced as is farther away from a middle of the LED 1017 with respect to the extending direction of the linear portion 35 (a circumferential direction of the light guide plate 1019). The overlap area where the light guide plate 1019 and the linear portion 35 are overlapped is increased as is closer to the middle of the LED 1017. This tendency is same as a distribution of the amount of light rays emitted by the LEDs 1017 and travelling toward the light guide plate 1019. Namely, the amount of light rays emitted by the LEDs 1017 and travelling toward the light guide plate 1019 tends to be reduced as is farther away from the middle of the LED 1017 with respect to the circumferential direction of the light guide plate 1019 and the amount of light rays tends to be increased as is closer to the middle of the LED 1017.

The amount of the light rays emitted by the LEDs 1017 is relatively great in the middle of the LED 1017 with respect to the circumferential direction of the light guide plate 1019. However, such great amount of the light rays can be effectively absorbed by a large width portion of the linear portion 35 of the bonding member 1025 (having a great overlap area in which the light guide plate 1019 and the linear portion 35 overlap). The amount of the light rays emitted by the LEDs 1017 is relatively small in end portions of the LED 1017 with respect to the circumferential direction of the light guide plate 1019. However, such small amount of the light rays is less likely to be absorbed by small width portions of the linear portion 35 of the bonding member 1025 (having a small overlap area in which the light guide plate 1019 and the linear portion 35 overlap). Accordingly, unevenness in brightness is less likely to be caused with respect to the circumferential direction of the light guide plate 1019.

As described before, according to this embodiment, the light guide plate 1019 has a substantially circular outline and the LED board 1018 has a substantially arched shape extending in the circumferential direction of the light guide plate 1019. The bonding member 1025 includes the linear portion 35 overlapping the LED 1017 with respect to the circumferential direction of the light guide plate 1019 and the linear portion 35 extends straightly to cross the circumferential direction. The amount of the light rays emitted by the LEDs 1017 and traveling toward the light guide plate 1019 tends to be reduced as is farther away from the middle of the LED 1017 with respect to the circumferential direction of the light guide plate 1019. The bonding member 1025 has the linear portion 35 that is an overlap area overlapping the LED 1017 with respect to the circumferential direction of the light guide plate 1019 and the linear portion 35 extends linearly to cross the circumferential direction. The overlap area in which the light guide plate 1019 and the linear portion 35 are overlapped is reduced as is farther away from the middle of the LED 1017 with respect to the extending direction of the linear portion 35 and this tendency is same as a distribution of the amount of light rays emitted by the LEDs 1017 and travelling toward the light guide plate 1019. Thus, the light rays are effectively absorbed by the middle portion of the linear portion 35 in the middle of the LED 1017 with respect to the circumferential direction of the light guide plate 1019 and the light rays are less likely to be absorbed by end portions of the linear portion 35 in the end portions of the LED 1917 with respect to the circumferential direction. Accordingly, unevenness in brightness is less likely to be caused in the circumferential direction of the light guide plate 1019.

Twelfth Embodiment

A twelfth embodiment of the present invention will be described with reference to FIGS. 30 and 31. In the twelfth embodiment, a bonding member 1125 has a plan view shape different from that in the eleventh embodiment. Configurations, operations, and effects similar to those of the eleventh embodiment will not be described.

Figure 30:
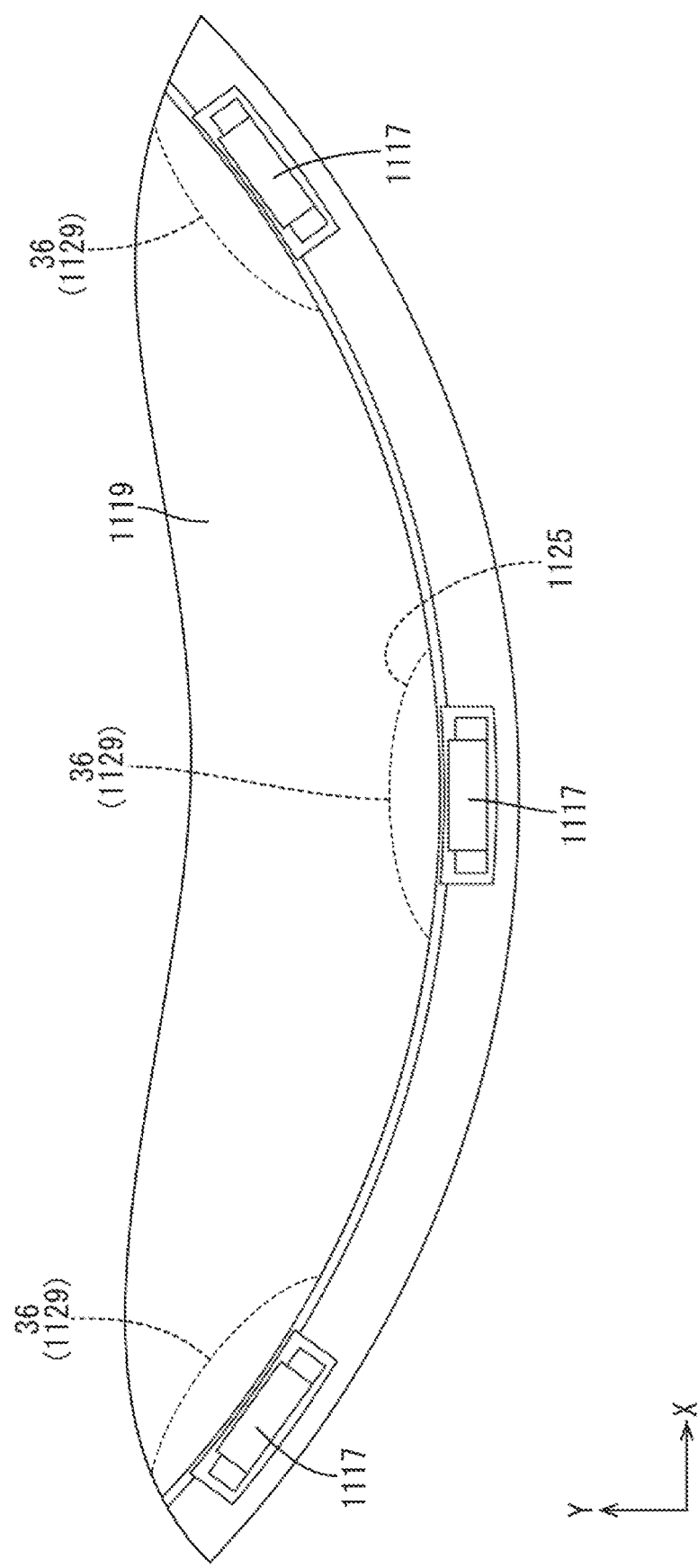
FIG. 30 is a plan view illustrating a part of a backlight device near LEDs according to a twelfth embodiment of the present invention.
Figure 31:
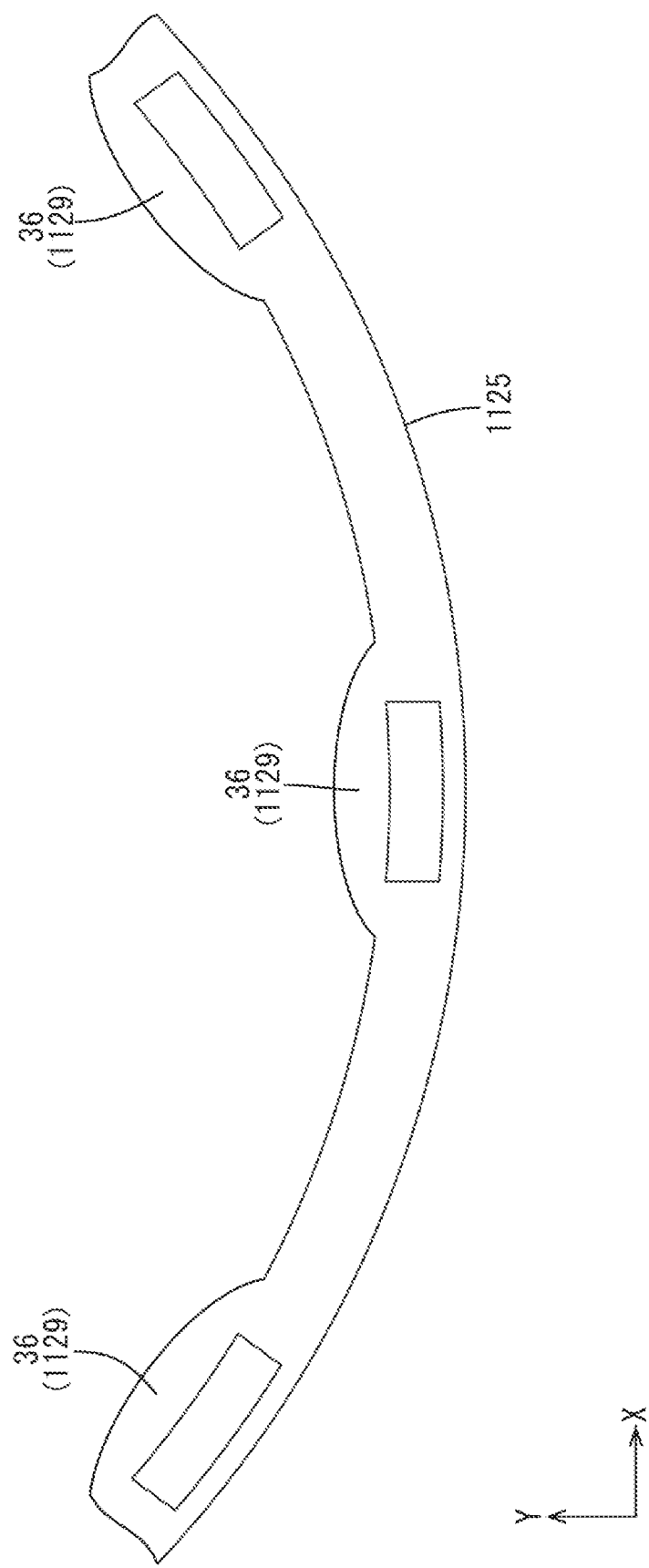
FIG. 31 is a plan view of a bonding member.

As illustrated in FIGS. 30 and 31, the bonding member 1125 of this embodiment includes curved portions 36 extending in a curved form such that a light guide plate overlapping portion 1192 crosses a circumferential direction of a light guide plate 1119. Specifically, the curved portion 36 is disposed to overlap each LED 1117 with respect to the circumferential direction of a light guide plate 1119 and the curved portions 3 are disposed at intervals with respect to the circumferential direction of a light guide plate 1119 according to a planar arrangement of the LEDs 1117. Each curved portion 36 has a substantially arched plan view shape at a middle edge portion overlapping the light guide plate 1119 and has a center of curvature outside a plate surface of the light guide plate 1119. Therefore, a light guide plate overlapping portion 1129 of each curved portion 36 has an overlap area in which the light guide plate 1119 and the curved portion 36 are overlapped, and the overlap area is reduced as is farther away from the middle of the LED 1117 with respect to the circumferential direction of the light guide plate 1119 and has an overlap area in which the light guide plate 1119 and the curved portion 36 are overlapped is increased as is closer to the middle of the LED 1117. Accordingly, the operations and effects same as those of the linear portions 35 in the eleventh embodiment can be obtained.

Other Embodiments

The present invention is not limited to the embodiments, which have been described using the foregoing descriptions and the drawings. For example, embodiments described below are also included in the technical scope of the present invention.

(1) In each of the above embodiments (except for the ninth to twelfth embodiments), the light guide plate bonding portion of the bonding member has a belt-like shape extending linearly. However, as is in the eleventh and twelfth embodiments, the width dimension of the light guide plate bonding portion may be changed such that an overlap area of the light guide plate bonding portion overlapping the light guide plate is reduced as is farther away from the middle of the LED with respect to the extending direction of the light entrance edge surface and the overlap area overlapping the light guide plate is increased as is closer to the middle of the LED.

(2) In each of the above embodiments, the light guide plate bonding portion of the bonding member includes a portion overlapping the LED and a portion not overlapping the LED with respect to the extending direction of the light entrance edge surface or the circumferential direction of the light guide plate. However, the light guide plate bonding portion may include only a portion overlapping the LED with respect to the extending direction of the light entrance edge surface or the circumferential direction of the light guide plate.

(3) In each of the above embodiments, the thickness t of the bonding member is smaller than the distance h between the outline of the effective light emission area and the mounting surface of the LED board. However, the thickness t may be equal to the distance h. The thickness t may be greater than the distance h.

(4) In each of the above embodiments (except for the third embodiment), the outer edge surface of the bonding member with respect to the Y-axis direction is on a same plane as the light entrance edge surface of the light guide plate. However, the outer edge surface of the bonding member with respect to the Y-axis direction may be closer to the LED than the light entrance edge surface of the light guide plate.

(5) In each of the above embodiments, the frame bonding portion of the bonding member is bonded to at least an entire area of each LED holding portion. However, the frame bonding portion may be bonded to a part of each LED bonding portion. The frame bonding portion may be bonded to a certain one of the LED holding portions and not be bonded to other LED holding portions.

(6) In each of the above embodiments (except for the second and tenth embodiments), the frame bonding portion of the bonding member is bonded to an entire area of the frame portion. However, the frame bonding portion may be bonded to a part of the frame portion.

(7) In each of the above embodiments, the bonding member is bonded to the frame. However, the bonding member may not be bonded to the frame (without including a frame bonding portion).

(8) In each of the above embodiments, the base member of the bonding member contains the light absorbing material. However, the base member of the bonding member may not contain the light absorbing material.

(9) In each of the above embodiments, the bonding layers in a pair included in the bonding member contain the light absorbing material. One of the bonding layers of the bonding member disposed on the LED board side may not contain the light absorbing material.

(10) In each of the above embodiments, the bonding member includes the base member and a pair of bonding layers. However, the bonding member may be formed of adhesive agent containing the light absorbing material. Namely, the bonding member may not include the base member but include only a light absorbing bonding layer.

(11) In each of the third to seventh embodiments, the light absorbing member is disposed on an area ranging from the LED to the light guide plate. However, the light absorbing member may be disposed to overlap the light guide plate but not to overlap the LEDs. The light absorbing member may be disposed on an area ranging from the LED to the light guide plate and overlap a part of the LED.

(12) In each of the third to seventh embodiments, the inner edge surface of the light absorbing member with respect to the Y-axis direction is on a same plane as the inner edge surface of the bonding member. However, the inner edge surface of the light absorbing member with respect to the Y-axis direction may be on an inner side or an outer side with respect to the inner edge surface of the bonding member.

(13) In the sixth embodiment, the portion of the bonding member and the light absorbing member overlapping the light guide plate has a width dimension of from 0.3 mm to 1 mm. However, this configuration may be applied to the configuration of each of the fifth, seventh, and eighth embodiments. The width dimension of the portion of the bonding member and the light absorbing member overlapping the light guide plate may not be within the above range.

(14) In each of the ninth to twelfth embodiments, the light guide plate has an arched peripheral edge portion over an entire periphery. However, the light guide plate may have a peripheral edge surface including an arched surface portion with respect to the circumferential direction and a linear light entrance edge surface.

(15) In each of the ninth to twelfth embodiments, the LED board (the light guide plate overlapping portion) and the bonding member (the light guide plate bonding portion) extend over an entire periphery of the circular light guide plate in the circumferential direction and have an endless ring shape. However, each of the LED board and the bonding member may partially extend in the circumferential direction of the light guide plate and have an arched portion formed to follow a part of the circumferential outer edge surface of the light guide plate. In such a configuration, the arched LED boards and the arched bonding members may be arranged in the circumferential direction of the light guide plate to surround substantially entire periphery of the light guide plate. One or multiple arched LED board and one or multiple arched bonding member may be disposed such that an entire periphery of the light guide plate may not surrounded by them. One of the LED board and the bonding member may be formed in an endless ring shape and another one of them may be formed to be an arched shape following a circumferential part of the peripheral edge surface of the light guide plate. In a configuration that the bonding member is formed in an arched shape following a circumferential part of the peripheral edge surface of the light guide plate, it is preferable to configure that an edge of the bonding member with respect to the circumferential direction of the light guide plate may not overlap the LED with respect to the circumferential direction of the light guide plate for less occurrence of unevenness in brightness.

(16) In each of the eighth to twelfth embodiments, the light guide plate has a circular shape. However, the light guide plate may have an ellipsoidal shape.

(17) Other than each of the above embodiments, the specific number of the LEDs mounted on the LED board may be altered if necessary.

(18) Other than each of the above embodiments, the specific number, the specific type, and the specific arrangement order of the optical sheet may be altered if necessary.

(19) The configuration described in the second embodiment may be combined with the configuration of each of the third to seventh embodiments.

(20) The configuration described in the third embodiment may be combined with the configuration of each of the fourth to twelfth embodiments.

(21) The configuration described in the fourth embodiment may be combined with the configuration of each of the fifth to twelfth embodiments.

(22) The configuration described in the fifth to seventh embodiments may be combined with the configuration of each of the eighth to twelfth embodiments.

(23) The configuration described in the eighth embodiment may be combined with the configuration of each of the tenth to twelfth embodiments.

(24) The configuration described in the tenth embodiment may be combined with the configuration of each of the eleventh and twelfth embodiments.

(25) In each of the above embodiments, the LED board is formed of a base member of a film. However, the base member of the LED board may be a plate having a certain thickness.

(26) In each of the above embodiments, the LED board includes the base board and the LEDs mounted on the base board. However, a light source board where other type of light source such as an organic EL is mounted may be included in a scope of the present invention.

(27) In each of the above embodiments, the liquid crystal display device is used in mobile information terminals such as smart phones or laptop computers. However, a liquid crystal display device used in on-vehicle information terminals (a portable car navigation system), and portable video game players may be included in the scope of the present invention.

(28) In each of the above embodiments, the liquid crystal panel includes the color filter of three colors including red, green, and blue. However, the present invention may be applied to the configuration including the color filter of four colors or more.

(29) In each of the above embodiments, the TFTs are used as switching components of the liquid crystal display device. However, switching components other than the TFTs (such as thin film diodes (TFDs)) may be included in the scope of the present invention. Furthermore, a liquid crystal display device configured to display black and white images other than the liquid crystal display device configured to display color images.

(30) In each of the above embodiments, the liquid crystal display device including the liquid crystal panel as the display panel is described. However, a MEMS display device including the backlight device, and a micro electro mechanical system (MEMS) display panel as the display panel may be included in the scope of the present invention.

EXPLANATION OF SYMBOLS 10, 510: liquid crystal display device (display device), 11, 311: liquid crystal panel (display panel), 12, 412, 512, 712: backlight device (lighting device), 16, 116, 716, 816: frame (frame member), 16a, 116a, 716a, 816a: frame portion, 16b, 116b, 716b, 816b: LED holding portions (light source holding portion), 17, 217, 317, 417, 517, 617, 717, 817, 1017, 1117: LED (light source), 17a, 517a, 1017a: light emission surface, 18, 118, 218, 518, 718, 818: LED board (light source board), 18a, 218a, 518a: mounting surface, 19, 119, 219, 319, 419, 519, 619, 719, 819, 1019, 1119: light guide plate, 19a, 219a, 419a, 519a, 619a, 719a, 819a: light entrance edge surface, 19b, 419b, 519b, 619b: light exit plate surface, 19c, 219c, 519c: opposite plate surface, 20, 320, 420, 520, 620: optical sheet (optical member), 22, 222, 522, 722, 822: light guide plate overlapping portion, 25, 125, 225, 325, 425, 525, 725, 825, 925, 1025, 1125: bonding member, 25a: base member, 25b: bonding layer, 26, 126, 226, 426, 526, 626, 726, 826: light entering side edge portion, 27, 227, 527: light absorbing bonding layer, 28, 128, 728, 828, 928: frame bonding portion (frame member bonding portion), 33: light absorbing member, 35: linear portion, EA: effective light emission area

The invention claimed is:

1. A lighting device comprising:
a light source;
a light guide plate including a light entrance edge surface that is a part of peripheral edge surfaces thereof and through which light from the light source enters, a light exiting plate surface that is one of a pair of plate surfaces thereof and through which light exits, and another one of the pair of plate surfaces being an opposite plate surface;
a light source board including a mounting surface on which the light source is mounted and a portion overlapping a portion of the light guide plate on an opposite plate surface side; and
a bonding member that is bonded to a portion of an overlapping area where the mounting surface of the light source board and the opposite plate surface of the light guide plate overlap each other, the bonding member including a light absorbing bonding layer containing light absorbing material, wherein
the bonding member is only in the portion of the overlapping area that is closer to a section of the light guide plate including the light entrance edge surface than to a light guide plate side edge surface of the light source board,
the light guide plate has a substantially circular outline and the light source board extends in a circumferential direction of the light guide plate and has a substantially arched shape, and
the bonding member includes a linear portion at a portion thereof overlapping the light source with respect to the circumferential direction of the light guide plate, the linear portion extends linearly and crosses the circumferential direction.

2. The lighting device according to claim 1, wherein
the light source has an effective light emission area in a part of a surface thereof opposite the light entrance edge surface of the light guide plate, light rays are effectively emitted from the effective light emission area, and
the bonding member has a thickness that is equal to or smaller than a distance from the mounting surface of the light source board to an outline of the effective light emission area.

3. The lighting device according to claim 1, wherein
the bonding member further includes a base member made of a film, and bonding layers in a pair that are disposed on a front surface and a rear surface of the base member, respectively, and the base member follows the mounting surface of the light source board and the opposite plate surface of the light guide plate, and
one of the bonding layers that is bonded to the opposite plate surface of the light guide plate is the light absorbing bonding layer.

4. The lighting device according to claim 3, wherein the base member of the bonding member contains light absorbing material.

5. The lighting device according to claim 3, wherein the bonding layers in a pair included in the bonding member are the light absorbing bonding layers.

6. The lighting device according to claim 1, further comprising a light absorbing member overlapping a portion of the light guide plate on the light exit plate surface side and containing a light absorbing material.

7. The lighting device according to claim 6, further comprising an optical member overlapping the light guide plate on the light exit plate surface side, wherein
the light absorbing member overlaps a portion of the optical member while the light absorbing member and the light guide plate sandwiching the optical member.

8. The lighting device according to claim 6, wherein the bonding member and the light absorbing member have portions overlapping the light guide plate and the portions have a dimension with respect to an arrangement direction of the light source and the light guide plate, and the dimension is within a range from 0.3 mm to 1 mm.

9. The lighting device according to claim 1, further comprising a frame member disposed to surround the light source and the light guide plate, wherein
the bonding member includes a frame member bonding portion bonding the mounting surface of the light source board and the frame member.

10. The lighting device according to claim 9, wherein
the frame member at least includes a frame portion extending along a periphery of the light guide plate, and light source holding portions disposed continuously from the frame portion and opposite the light entrance edge surface of the light guide plate to sandwich the light source from two sides thereof, and
the frame member bonding portion is bonded to the mounting surface of the light source board and at least the light source holding portions of the frame member.

11. The lighting device according to claim 10, wherein the frame member bonding portion is bonded to the mounting surface of the light source board, the light source holding portions and the frame portion of the frame member.

12. The lighting device according to claim 1, wherein
the bonding member extends along the light entrance edge surface of the light guide plate, and
the bonding member includes a portion overlapping the light source in an extending direction in which the bonding member extends and a portion not overlapping the light source.

13. A display device comprising:
the lighting device according to claim 1; and
a display panel displaying images using light from the lighting device.

14. A lighting device comprising:
a light source;
a light guide plate including a light entrance edge surface that is part of peripheral edge surfaces thereof and through which light from the light source enters, a light exiting plate surface that is one of a pair of plate surfaces thereof and through which light exits, and another one of the pair of plate surfaces being an opposite plate surface;
a light source board including a mounting surface on which the light source is mounted, and a portion overlapping a portion of the light guide plate on an opposite plate surface side; and
a bonding member that is bonded to the mounting surface of the part of the light source board and to the opposite plate surface of the part of the light guide plate, the bonding member including a light absorbing bonding layer containing light absorbing material, wherein
the light guide plate has a substantially circular outline and the light source board extends in a circumferential direction of the light guide plate and has a substantially arched shape, and
the bonding member includes a linear portion at a portion thereof overlapping the light source with respect to the circumferential direction of the light guide plate, the linear portion extends linearly and crosses the circumferential direction.

* * * * *